(12) United States Patent
Ito et al.

(10) Patent No.: US 8,065,495 B2
(45) Date of Patent: Nov. 22, 2011

(54) APPARATUS, METHOD AND COMPUTER PROGRAM FOR PROCESSING INFORMATION

(75) Inventors: Ryogo Ito, Tokyo (JP); Hiroshi Shimono, Tokyo (JP); Junichi Yokota, Kanagawa (JP); Tatsuya Hine, Tokyo (JP)

(73) Assignee: Sony Corporation, Tokyo (JP)

( * ) Notice: Subject to any disclaimer, the term of this patent is extended or adjusted under 35 U.S.C. 154(b) by 841 days.

(21) Appl. No.: 12/032,037

(22) Filed: Feb. 15, 2008

(65) Prior Publication Data

US 2008/0239886 A1 Oct. 2, 2008

(30) Foreign Application Priority Data

Mar. 30, 2007 (JP) ................. 2007-094752

(51) Int. Cl.
*G06F 12/00* (2006.01)
(52) U.S. Cl. ............ 711/155; 711/4; 711/200; 711/201; 711/202
(58) Field of Classification Search .................. None
See application file for complete search history.

(56) References Cited

U.S. PATENT DOCUMENTS

2006/0224823 A1* 10/2006 Morley et al. ................. 711/113

FOREIGN PATENT DOCUMENTS

JP 2003-308240 10/2003

OTHER PUBLICATIONS

U.S. Appl. No. 12/034,463, filed Feb. 20, 2008, Ito, et al.
U.S. Appl. No. 12/160,847, Jul. 14, 2008, Shimono, et al.

* cited by examiner

*Primary Examiner* — Kevin Ellis
*Assistant Examiner* — Alan Otto
(74) *Attorney, Agent, or Firm* — Oblon, Spivak, McClelland, Maier & Neustadt, L.L.P.

(57) ABSTRACT

An information processing apparatus for recording data onto a recording medium, includes an access controller for outputting, to a medium-specific controller, record data input from an application and directed to the recording medium. The access controller performs a read-modify-write (RMW) operation by verifying whether one of a record start position and a record end position of the record data input by a logical sector unit from the application is different from a delimitation position of a physical sector as an access unit of the recording medium, acquiring the record data by the physical sector unit and storing the record data onto a memory if one of the record start position and the record end position is different from the delimitation position, updating logical sector data as part of stored physical sector data with the input record data, and outputting the updated physical sector data to the medium-specific controller.

11 Claims, 22 Drawing Sheets

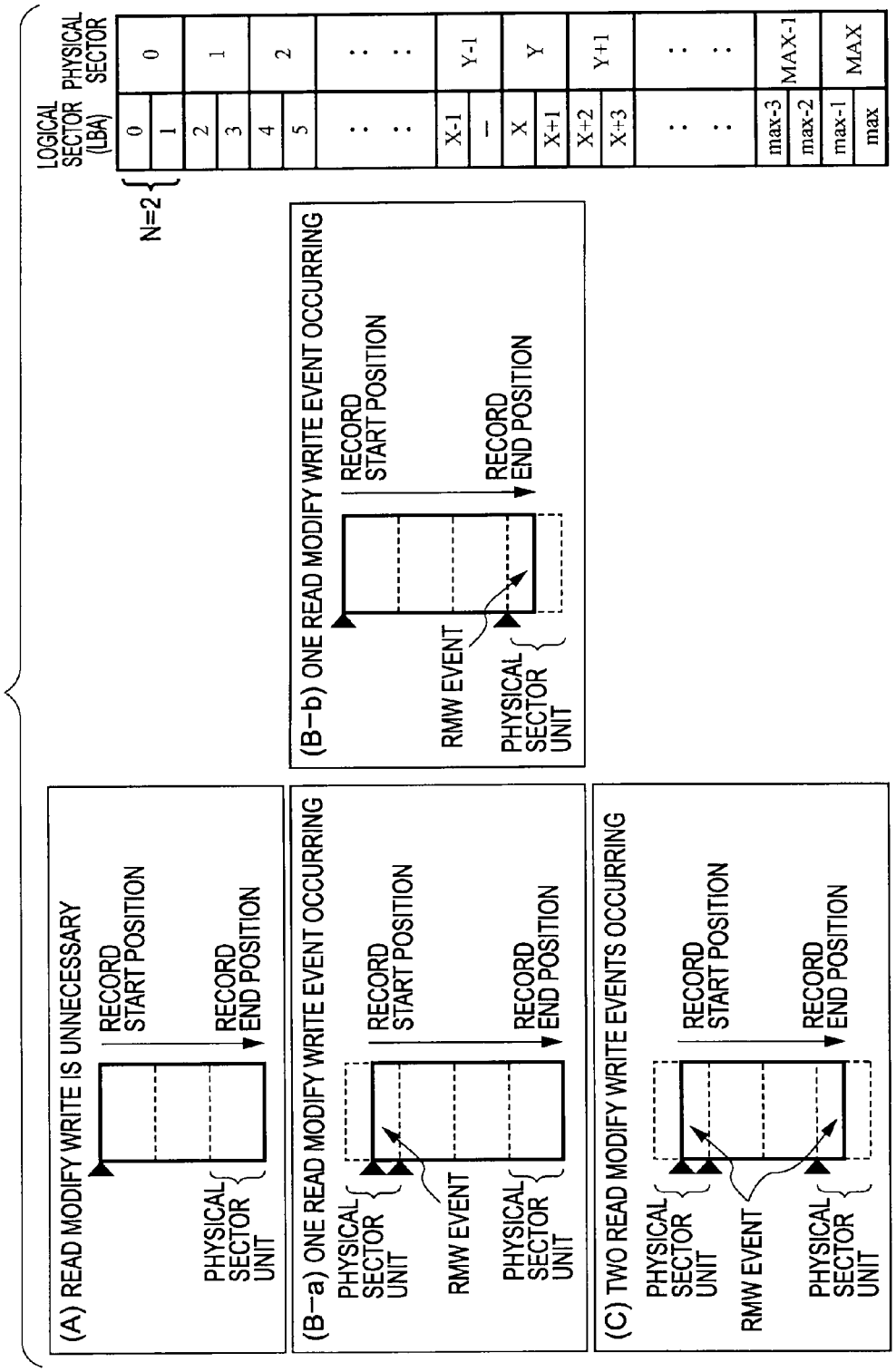

FIG. 5A

| CASE | DATA HEAD RMW | | DATA TAIL RMW | |
|---|---|---|---|---|
| | UNNECESSARY | NECESSARY | UNNECESSARY | NECESSARY |
| (A) | — | — | — | — |
| (B-a) | — | YES | — | — |
| (B-b) | — | — | — | YES |
| (C) | — | YES | — | YES |

FIG. 5B

| LOGICAL SECTOR (LBA) | 0 | 1 | 2 | 3 | 4 | 5 | ... | X-1 | — | X | X+1 | X+2 | X+3 | ... | max-3 | max-2 | max-1 | max |
|---|---|---|---|---|---|---|---|---|---|---|---|---|---|---|---|---|---|---|
| PHYSICAL SECTOR | 0 | | 1 | | 2 | | ... | Y-1 | | Y | | Y+1 | | ... | MAX-1 | | MAX | |

N=2

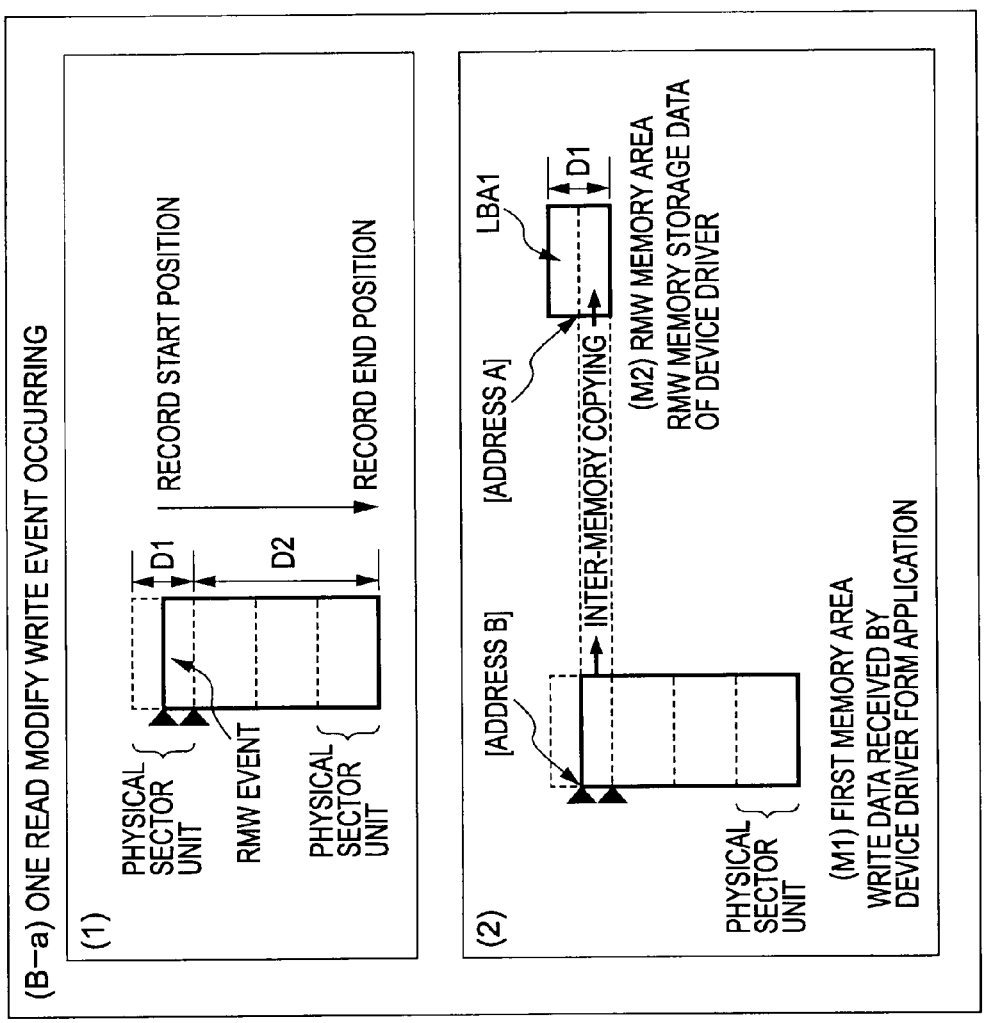

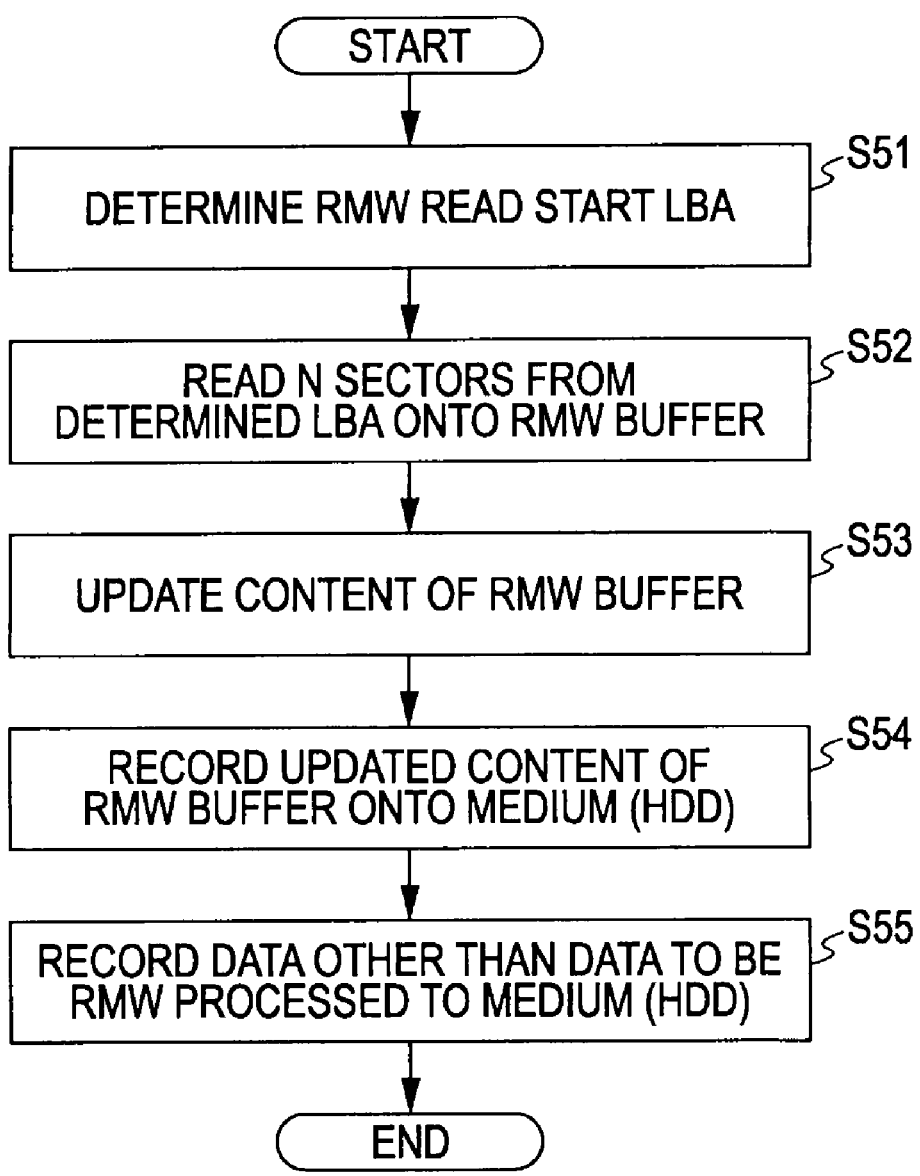

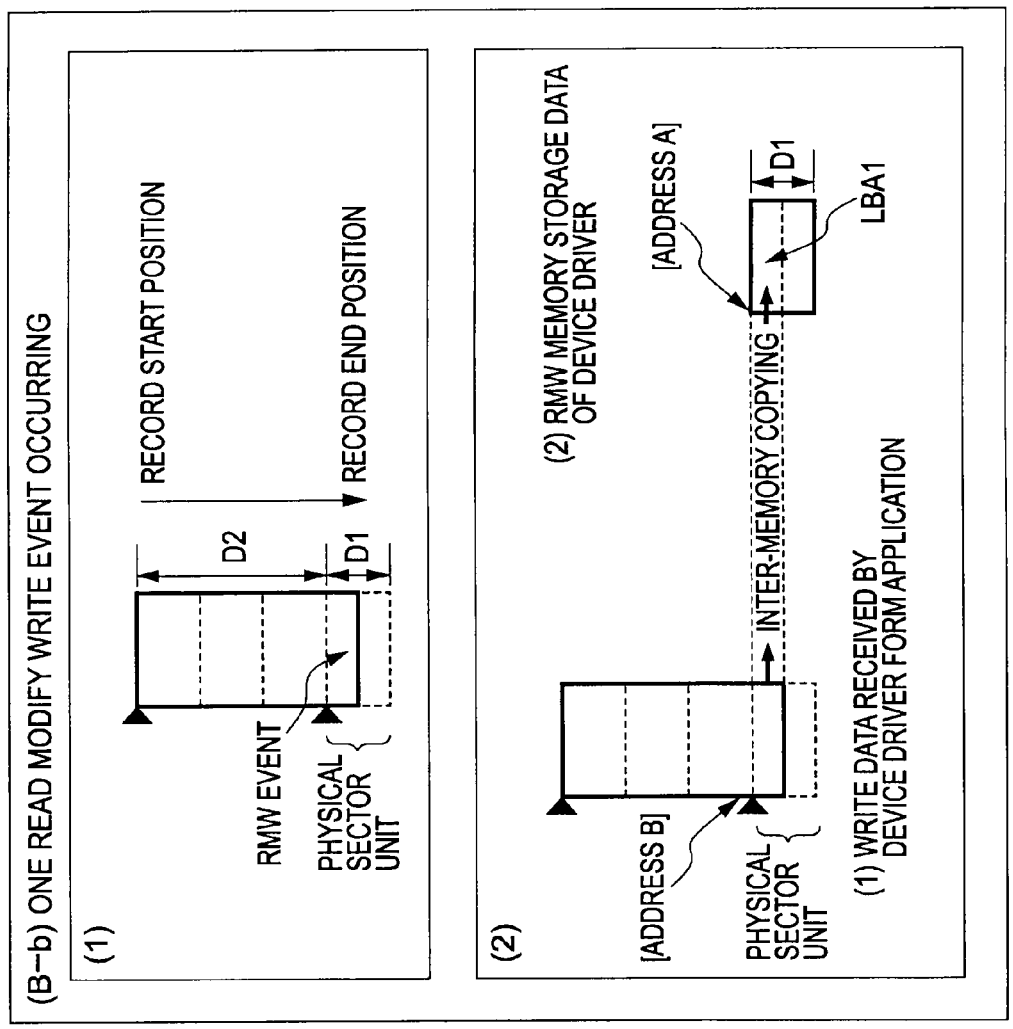

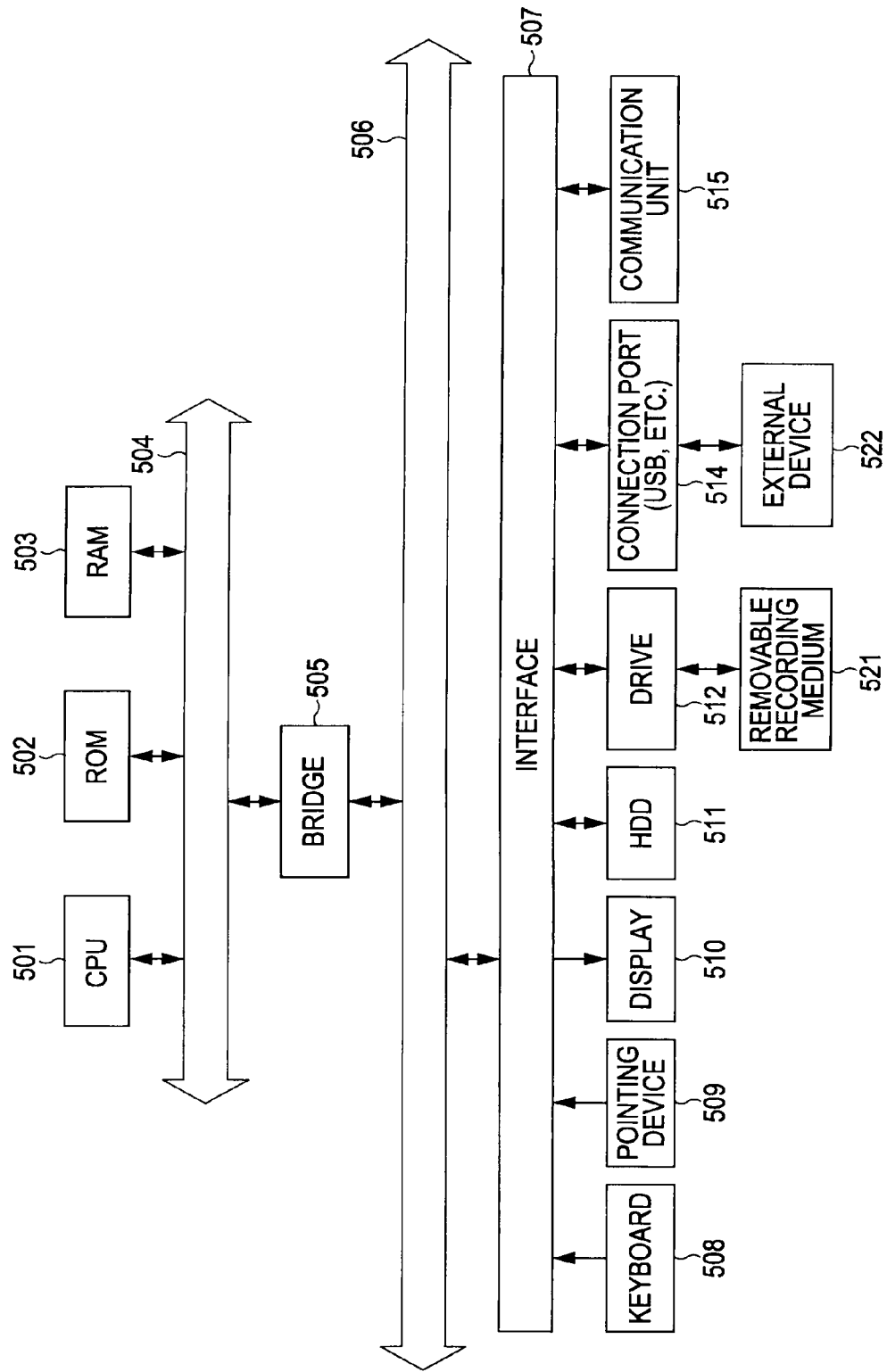

APPARATUS, METHOD AND COMPUTER PROGRAM FOR PROCESSING INFORMATION

CROSS REFERENCES TO RELATED APPLICATIONS

The present invention contains subject matter related to Japanese Patent Application JP 2007-094752 filed in the Japanese Patent Office on Mar. 30, 2007, the entire contents of which are incorporated herein by reference.

BACKGROUND OF THE INVENTION

1. Field of the Invention

The present invention relates to an information processing apparatus, an information processing method and a computer program. More particularly, the present invention relates to an information processing apparatus, an information processing method and a computer program applied to a system that performs a data recording and reproducing process on a recording medium such as a hard disk with a data unit as an access unit used by one of an application and a device driver being different from a data unit used for internal management by the recording medium.

2. Description of the Related Art

Information processing apparatuses including a digital video camera and a personal computer perform an information recording process and an information reproducing process using an information recording medium such as a hard disk. When the information processing apparatus performs one of the information recording process and the information reproducing process, an application (program) generates or designates record data, outputs the record data to the information recording medium or receives reproducing data from the information recording medium.

For example, one of the application and the device driver accesses the information recording medium using logical block addressing (LBA) of 512 byte unit. If the LBA access unit of 512 bytes matches a management data unit in the hard disk drive (HDD), no problems are expected. If both units fail to match each other, the system may suffer from problems.

For example, a physical sector may include N logical sectors as an access unit within the HDD. By increasing the management unit of the HDD, a setting unit of error correction code (ECC) is enlarged in order to increase processing efficiency. With an amount of ECC data reduced, a storage area is efficient used.

In this way, the data access unit of the upper layer (including the application and the device driver) may be different from the data access of a controller in the information recording medium and the access unit in the information recording medium may be larger than the access unit of the upper layer. If an instruction to record data or reproduce data is issued from the upper layer to the information recording medium, a reading process or a recording process may be performed on an entire data area that collectively includes a designated area on the information recording medium.

When the application reads and updates data recorded on the information recording medium, the update process of the data on the application side is performed by logical sector unit. The information recording medium (for example, HDD) reads data by access unit of the medium containing the sector data to be updated, namely, by physical sector unit and temporarily stores the read data onto a memory in the information recording medium. The information recording medium updates only a data portion to be updated input via the device driver from the application and rerecords the updated data.

For example, if a read error occurs in the physical sector of the information recording medium, the logical data updated is substituted by the application and stored on a spare area as an emergency data recording area of the information recording medium. As for unupdated data contained in the same physical sector as the updated logical sector, dummy data temporarily stored on the memory of the information recording medium is directly stored on the spare area due to the read error occurring in the information recording medium. This means that the unupdated data is handled as if it were missing. The application and the device driver on the upper layer cannot detect data missing at all.

Semiconductor memories perform a garbage collection. In the garbage collection, a memory area is reserved if a recorded cluster is present in the same deleting block subsequent to a cluster as a target of writing. Japanese Unexamined Patent Application Publication No. 2003-308240 discloses a technique that arranges a variety of information on a medium so that such a garbage collection is not frequently generated. However, controlling the layout of information related to a file system such as file allocation table (FAT) on the information recording medium such as HDD is difficult in practice.

SUMMARY OF THE INVENTION

It is thus desirable to detect the occurrence of data missing in an upper layer and prevent other data from being accidentally missing when an access unit used by one of an application and a device driver fails to match an internal management unit of an information recording medium such as HDD.

In accordance with one embodiment of the present invention, an information processing apparatus for recording data onto a recording medium, includes an access controller for outputting, to a medium-specific controller, record data input from an application and directed to the recording medium. The access controller performs a read-modify-write (RMW) operation by verifying whether one of a record start position and a record end position of the record data input by a logical sector unit from the application is different from a delimitation position of a physical sector as an access unit of the recording medium managed by the medium-specific controller, acquiring the record data by the physical sector unit via the medium-specific controller and storing the record data onto a memory if one of the record start position and the record end position is different from the delimitation position, updating logical sector data as part of stored physical sector data with the record data input by the sector unit from the application, and outputting the updated physical sector data to the medium-specific controller.

The access controller may verify based on a count of logical sectors N contained in one physical sector whether one of the record start position and the record end position of the record data input by the logical sector unit from the application is different from the delimitation position of the physical sector as the access unit of the recording medium managed by the medium-specific controller.

Based on a phase change point X where phase changes in a correspondence relationship between the logical sector and the physical sector, the access controller may verify whether one of the record start position and the record end position of the record data input by the logical sector unit from the application is different from the delimitation position of the physical sector as the access unit of the recording medium managed by the medium-specific controller.

In the RMW operation, the access controller may copy the logical sector data as a target of the RMW operation from a first memory area storing the record data input by the logical sector unit from the application to an RMW memory area.

The access controller may generate, as a management information list of the record data, a write list listing a logical block address (LBA) for the record data, a sector count indicating the number of sectors of the record data and offset information of a logical sector number and records the record data input from the application with reference to the write list.

The access controller may generate a first write list of the record data prior to a phase change point X and a second write list of the record data subsequent to the phase change point X if the phase change point where phase changes in the correspondence relationship between the logical sector and the physical sector is present and if the record data input by the logical sector unit from the application extends across the phase change point.

In accordance with one embodiment of the present invention, an information processing method for recording data onto a recording medium, includes a step of controlling access by outputting, to a medium-specific controller, record data input from an application and directed to the recording medium. The step of controlling access includes verifying whether one of a record start position and a record end position of the record data input by a logical sector unit from the application is different from a delimitation position of a physical sector as an access unit of the recording medium managed by the medium-specific controller, and performing a read-modify-write (RMW) operation by acquiring the record data by the physical sector unit via the medium-specific controller and storing the record data onto a memory if one of the record start position and the record end position is different from the delimitation position, updating logical sector data as part of stored physical sector data with the record data input by the sector unit from the application, and outputting the updated physical sector data to the medium-specific controller.

The step of controlling access may include verifying based on a count of logical sectors N contained in one physical sector whether one of the record start position and the record end position of the record data input by the logical sector unit from the application is different from the delimitation position of the physical sector as the access unit of the recording medium managed by the medium-specific controller.

Based on a phase change point X where phase changes in a correspondence relationship between the logical sector and the physical sector, the step of controlling access may include verifying whether one of the record start position and the record end position of the record data input by the logical sector unit from the application is different from the delimitation position of the physical sector as the access unit of the recording medium managed by the medium-specific controller.

The step of controlling access may include copying the logical sector data as a target of the RMW operation from a first memory area storing the record data input by the logical sector unit from the application to an RMW memory area.

The step of controlling access may include generating, as a management information list of the record data, a write list listing a logical block address (LBA) for the record data, a sector count indicating the number of sectors of the record data and offset information of a logical sector number and records the record data input from the application with reference to the write list.

The step of controlling access may include generating a first write list of the record data prior to a phase change point X and a second write list of the record data subsequent to the phase change point X if the phase change point where phase changes in the correspondence relationship between the logical sector and the physical sector is present and if the record data input by the logical sector unit from the application extends across the phase change point.

In accordance with one embodiment of the present invention, a computer program for recording data onto a recording medium, includes a step of controlling access by outputting, to a medium-specific controller, record data input from an application and directed to the recording medium. The step of controlling access includes verifying whether one of a record start position and a record end position of the record data input by a logical sector unit from the application is different from a delimitation position of a physical sector as an access unit of the recording medium managed by the medium-specific controller, and performing a read-modify-write (RMW) operation by acquiring the record data by the physical sector unit via the medium-specific controller and storing the record data onto a memory if one of the record start position and the record end position is different from the delimitation position, updating logical sector data as part of stored physical sector data with the record data input by the sector unit from the application, and outputting the updated physical sector data to the medium-specific controller.

A computer program in accordance with one embodiment of the present invention may be supplied in a computer readable form to a recording medium in a general-purpose computer system performing a variety of program code. The computer system thus performs a process responsive to the computer program with the computer program supplied in a computer readable form.

These and other objects, features and advantages of the present invention will become apparent from the following description of the embodiments of the present invention with reference to the accompanying drawings. The term system in this specification refers to a logical set of a plurality of apparatuses and elements of each apparatus are not necessarily housed in the same casing.

In accordance with embodiments of the present invention, the access controller outputs, to the recording medium-specific controller, the record data input from the application and directed to the recording medium. The access controller performs the read-modify-write (RMW) operation by verifying whether one of the record start position and the record end position of the record data input by the logical sector unit from the application is different from the delimitation position of the physical sector as the access unit of the recording medium managed by the medium-specific controller, acquiring the record data by the physical sector unit via the medium-specific controller and storing the record data onto the memory if one of the record start position and the record end position is different from the delimitation position, updating logical sector data as part of stored physical sector data with the record data input by the sector unit from the application, and outputting the updated physical sector data to the medium-specific controller. All data of physical sector units is input and output between the device driver and the medium-specific controller. The logical sector data free from data updating is verified on the device driver. An unpredictable event such as data missing is thus learned on the upper layer.

BRIEF DESCRIPTION OF THE DRAWINGS

FIG. 4 illustrates a read-modify-write (RMW) process and whether to perform the RMW process;

FIGS. 5A and 5B illustrate the RMW process and whether to perform the RMW process;

FIGS. 6A and 6B specifically illustrate the RMW process;

FIG. 7 is a flowchart illustrating a sequence of the RMW process;

FIGS. 8A and 8B specifically illustrate the RMW process;

FIG. 22 illustrates a personal computer in accordance with one embodiment of the present invention.

DESCRIPTION OF THE PREFERRED EMBODIMENTS

With reference to the drawings, an information processing apparatus, an information processing method and a computer program in accordance with embodiments of the present invention are described below.

A problem caused by a difference between an access unit of an upper layer (such as an application or a device driver) and an access unit of an information recording medium is described below with reference to FIGS. 1 through 3.

In the embodiments to be discussed below, the upper layer (one of the application and the device driver) accesses the medium by logical block addressing of 512 bytes, namely, a logical sector unit, and the access unit within the information recording medium such as an hard disk drive (HDD) is a physical sector corresponding to N logical sectors. Here, N is 2 or greater.

Figure 1:
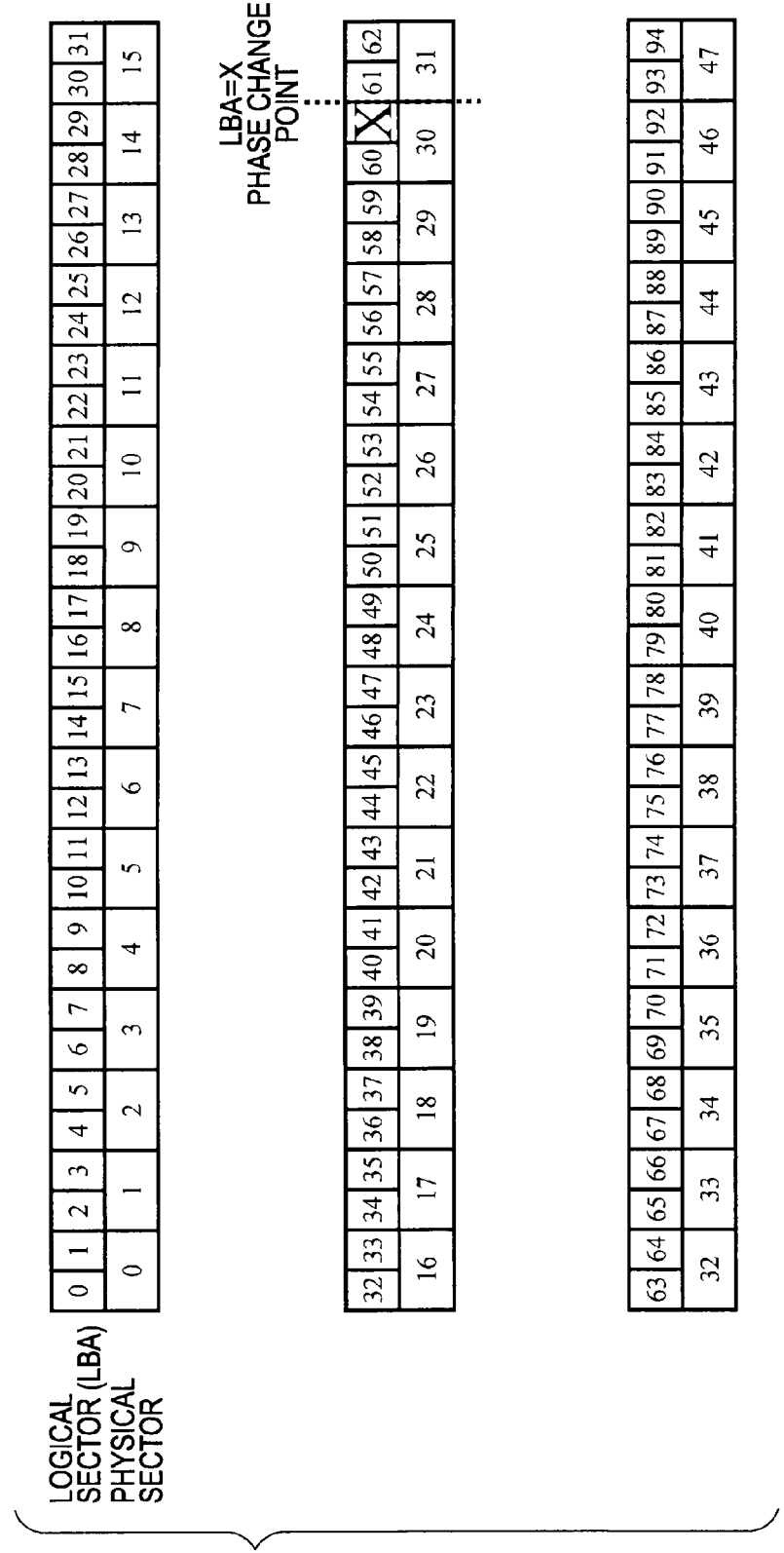
FIG. 1 illustrates a correspondence relationship between a logical sector (LBA) as an access unit of a device driver and a physical sector as an access unit of a medium such as a hard disk drive (HDD)

FIG. 1 illustrates a correspondence relationship between a logical sector (LBA) as the access unit of the device driver and a physical sector as the access unit of the hard disk drive (HDD). The upper row indicates the logical sectors and the lower row indicates the physical sectors in FIG. 1. The physical sector is composed of two logical sectors. In other words, the number of logical sectors N contained in one physical sector is 2.

N represents (physical sector)÷(logical sector) and refers to the "number of logical sectors collectively managed within the HDD."

As shown in FIG. 1, the letter X is written next to the logical sector (LBA=60) and a logical sector (LBA=61) is set subsequent to the logical sector (LBA=60). There are times when a point changing in the correspondence relationship between the logical sector and the physical sector may be set. More specifically, a LBA changing in phase is labeled the letter X. As shown in FIG. 1, X=61.

Within a range of LBA of from 0 to X−1, the relationship of physical sector number=logical sector number (LBA)×M÷N (M≧0) holds true. Within a range of LBA of from X through MAX, the same relationship does not hold true. For example, if the number of logical sectors N contained in one physical sector is 2, the physical sector number=(logical sector number (LBA)+1)×M÷N (M≧0).

As shown in FIG. 1, N=2. For example, information stored on LBA=2 and information stored on LBA=3 are managed in one group within the HDD, i.e., managed as information having the physical sector number=1. When one of the data recording process and the data reproducing process is performed, one of data reading from the medium and data writing to the medium on a per physical sector unit is performed.

As shown in FIG. 1, the phase change point X=61. Within the range of LBA of from 0 to 60, even-numbered addresses (0, 2, 4, . . . ) are placed at the leading positions of respective physical sectors. In the range of LBA 61 and subsequent logical sectors, odd-numbered addresses (61, 63, 65, . . . ) are placed at the leading positions of respective physical sectors.

Figure 2:
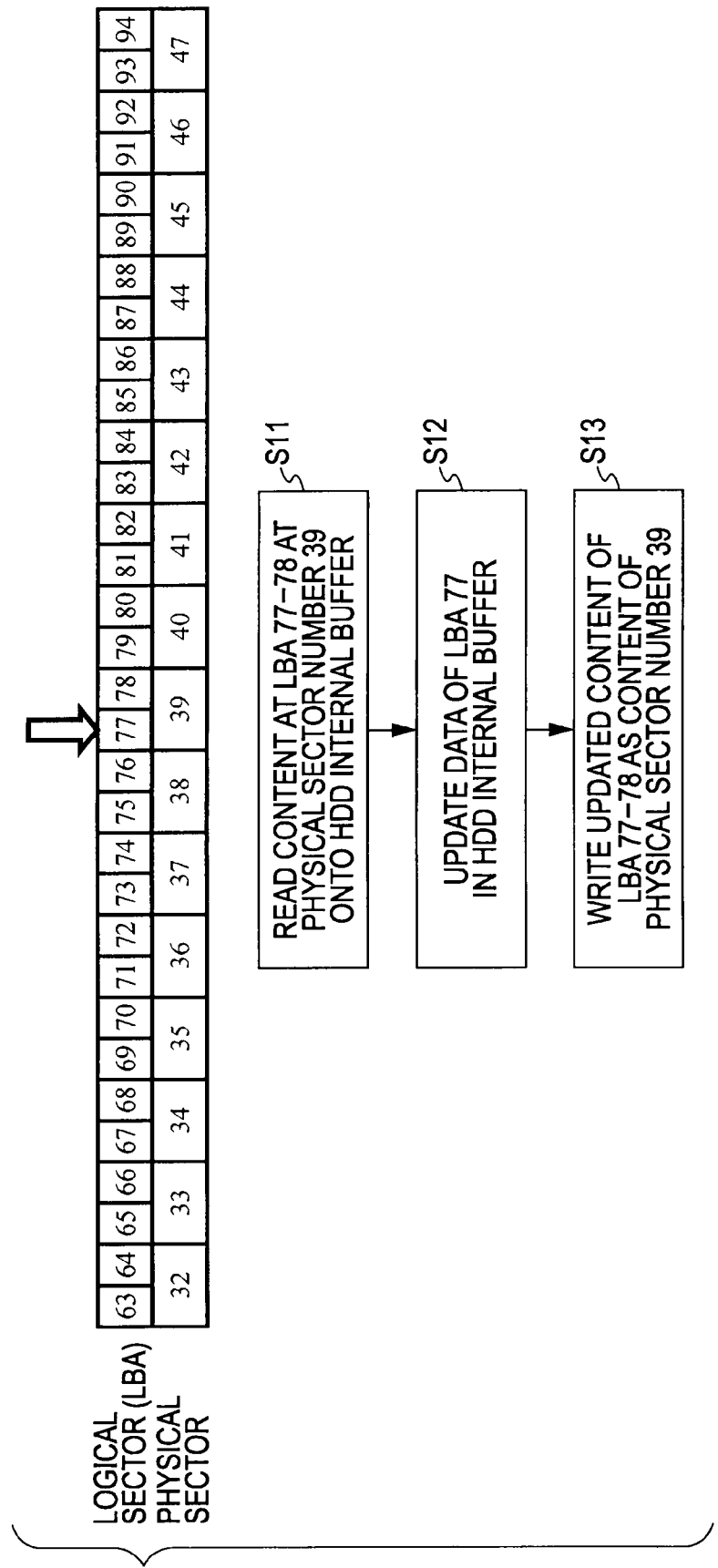
FIG. 2 illustrates a problem in an access process created when the logical sector as an access unit of the upper layer is different from the physical sector as an access unit of the medium.
Figure 3:
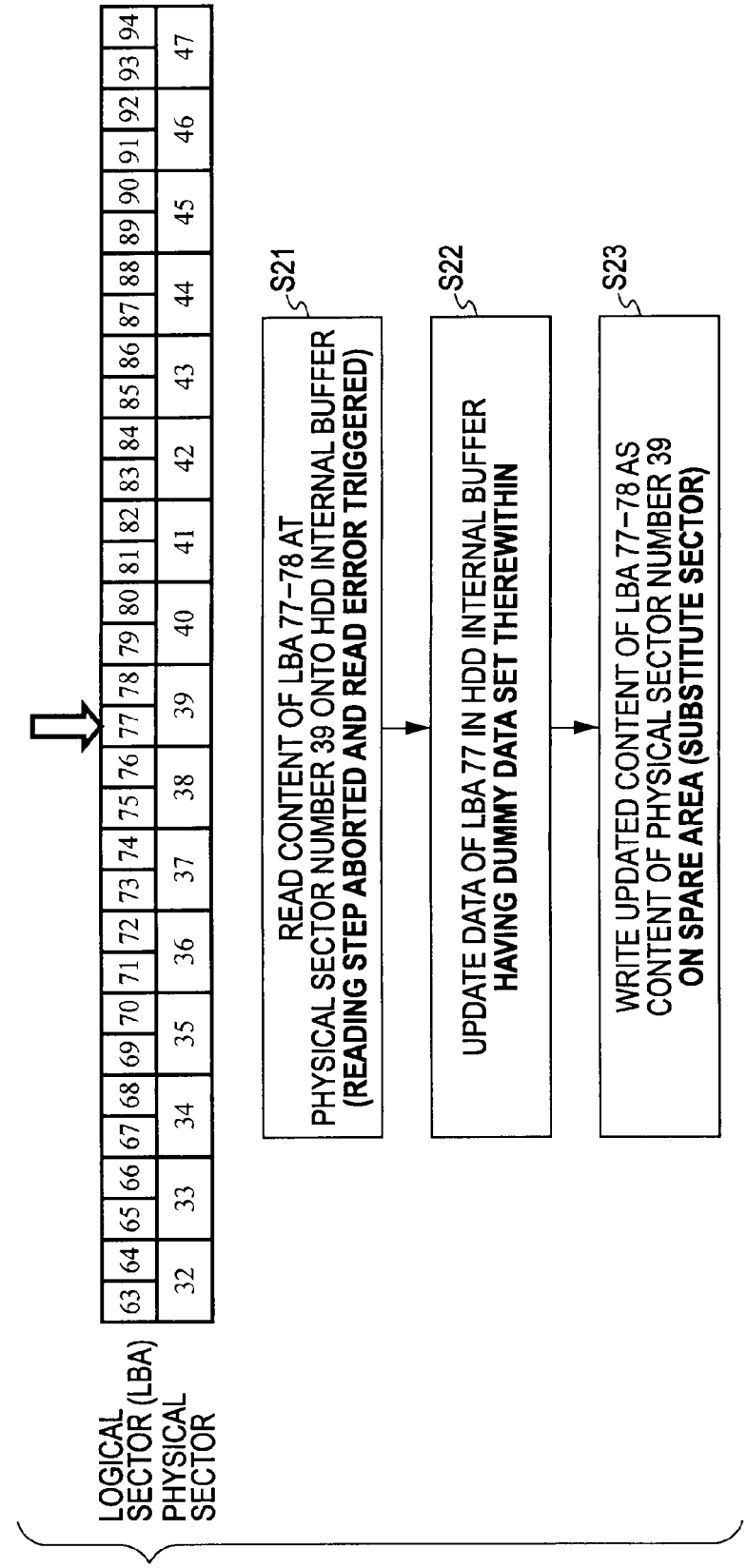
FIG. 3 illustrates a problem in an access process created when the logical sector as an access unit of the upper layer is different from the physical sector as an access unit of the medium.

With reference to FIGS. 2 and 3, a problem caused in the access process when the logical sector (LBA) as the access unit of the upper layer (one of the application and the device driver) is different from the physical sector as the access unit of the information recording medium.

In the same manner as FIG. 1, FIG. 2 illustrates the correspondence relationship between the logical sector and the physical sector. The number of logical sector per physical sector is N=2 and the phase change point X=61.

When the device driver issues a write request to the HDD by designating a write start LBA=77 and a write sector count=1, a data write process is performed on a hard disk as shown in FIG. 2.

A content of LBA=77-78 at a physical sector number=39 is read into a buffer within the HDD (step S11).

Data of LBA=77 is updated with updating data within the HDD buffer with the updating data supplied from an upper layer device (step S12).

The updated content at LBA=77-78 is written as the content of the physical sector number=39.

Through this process, the updated data is recorded. The data at LBA=78 is read onto the HDD buffer within the HDD for re-writing (step S13).

The problem in the process of FIG. 2 is now described with reference to FIG. 3. FIG. 3 illustrates a process that is performed when an error occurs in the data reading process in step S11 for reading data onto the HDD performed. The data write process onto the hard disk is performed in the HDD as shown in FIG. 3.

A content at LBA=77–78 at the physical sector number=39 is read onto the HDD buffer. It is now assumed that the read process is aborted at this point (step S21).

Dummy data is set for LBA=77–78 at the physical sector number=93 due to the read error in the HDD buffer. The dummy data at LBA=77 is updated. Updating data is supplied from the device driver at the upper layer (Step S22).

The updated content at LBA=77–78 is written as the content at the physical sector number=39 on a spare area (substitute sector) as an area used in the occurrence of the read error (step S23).

Once data updating is performed, the data written on the spare area (substitute sector) contains the updating data supplied from the device driver at LBA=77 and the dummy data set in the HDD at LBA=78.

More specifically, the data at LBA=78 other than the data at LBA in need of updating is missing. Even if such an error takes place, the device driver at the upper layer is unable to detect the data missing and still determines that the data recording has been normally performed.

The information processing apparatus of one embodiment of the present invention is designed to prevent the occurrence of the event discussed with reference to FIG. 3. The process of one embodiment of the present invention is described below.

In order to prevent the event discussed with reference to FIG. 3 from occurring, the information processing apparatus of one embodiment of the present invention issues a write request taking into consideration the number of logical sectors N contained in one physical sector. In a system having a phase change point, the write process is preferably performed taking into consideration the phase change point X.

The write request to a medium such as a hard disk driven by a device driver is issued with the number of logical sectors N contained in one physical sector accounted for. More specifically, the write request is issued after determining whether a process requiring a data reading process, a data updating process and a data re-writing process by the recording medium to an internal buffer of the recording medium occurs.

The data reading process, the data updating process and the data rewriting process by the recording medium to the internal buffer of the recording medium are described in the flowcharts of FIGS. 2 and 3. These processes are collectively referred to as a read-modify-write (RMW) process. When the RMW process occurs, data read onto the internal buffer of the recording medium is written onto an accessible memory area of the device driver and the data reading process, the data updating process and the data re-writing process are performed on the accessible memory area of the device driver by physical sector.

The read-modify-write process is described more specifically with reference to FIG. 4. The RMW process is performed when one of an access start position and an access end position of the device driver fails to match a delimitation position of a physical sector as an access unit of a recording medium such as the hard disk. In such a case, the data read onto the internal buffer of the recording medium is written onto an accessible memory area of the device driver (buffer area compatible with the device driver) and the data reading process, the data updating process and the data re-writing process are performed on the accessible memory area of the device driver by physical sector.

FIG. 4 illustrates the necessity of the RMW process in response to the data access method of the device driver.

In a case (A), each of the data access start position and the data access end position of the device driver is aligned with the border of the physical sector as the access unit of the recording medium (HDD). In such a case, no RMW process is performed.

In cases (B-a) and (B-b), one of the data access start position and the data access end position of the device driver fails to be aligned with the border of the physical sector as the access unit of the recording medium. In such a case, the RMW process is performed.

More specifically, in the case (B-a) of FIG. 4, the data access start position of the device driver fails to be aligned with the border of the border of the physical sector. In such a case, the RMW process is performed to process one physical sector containing a logical sector number prior to a logical sector number at the data access start position.

In the case (B-b) of FIG. 4, the data access end position of the device driver fails to be aligned with the border of the border of the physical sector. In such a case, the RMW process is performed to process one physical sector containing a logical sector number subsequent to a logical sector number at the data access end position.

In a case (C) of FIG. 4, none of the data access start position and the data access end position of the device driver of the device driver is aligned with the border of the physical sector as the access unit. In such a case, the RMW process is performed to process one physical sector containing a logical sector number prior to a logical sector number at the data access start position and to process one physical sector containing a logical sector number subsequent to a logical sector number at the data access end position.

FIG. 5A is a table listing the necessity of the RMW process determined depending on the data write cases illustrated in FIG. 4 at the data access start position and the data access end position of the device driver. Depending on address information (LBA) for data accessing, the device driver (or the application) determines whether the case is (A), (B-a), (B-b) or (C). The device driver thus determines the necessity of the RMW process. If the RMW process is required, the device driver performs the RMW process.

The device driver performs the RMW process necessity determination process based on the address information (LBA).

The application determines a write start LBA and a write sector count. The device driver calculates a write end LBA=write start LBA+write sector count−1.

The device driver enters as parameters a logical sector count N contained in one physical sector and the phase change point X, and performs the RMW process necessity determination process in accordance with the following algorithm:

```
if(write start LBA>X){
LBA serving as a determination reference=0;
} else {
LBA serving as a determination reference=X;
}
if (write start LBA − determination reference LBA)%N{
RMW process required for data head;
} else {
RMW process not required for data head;
}
if (write end LBA−determination reference LBA)%N{
RMW process required for data tail;
} else {
RMW process not required for data tail;
}
```

The device driver calculates the write end LBA=(write start LBA+write sector count−1) based on the write start LBA, the logical sector count N contained in one physical sector and the phase change point X. If the determination results show that the execution of the RMW process is required, the RMW process is performed. The data reading process, the data updating process and the data re-writing process are thus performed on an accessible memory (buffer) on the device driver by physical sector unit.

The processes to be performed in the cases (A), (B-a), (B-b) and (C) of FIGS. 4 and 5 are specifically described below. In the case (A) of FIG. 4, each of the data access start position of the device driver and the data access end position of the device driver is aligned with the border of the physical sector as the access unit of the recording medium (HDD). In such a case, no RMW process is performed.

In the cases (B-a) and (B-b) of FIG. 4, one of the data access start position and the data access end position of the device driver fails to be aligned with the border of the physical sector as the access unit of the recording medium. In such a case, the RMW process is performed.

More specifically, in the case (B-a) of FIG. 4, the data access start position of the device driver fails to be aligned with the border of the border of the physical sector. In such a case, the RMW process is performed to process one physical sector containing a logical sector number prior to a logical sector number at the data access start position.

A data recording process containing the RMW process in the case (B-a) is described below with reference to FIGS. 6 and 7. Case (1) of FIG. 6 identical to the case (B-a) of FIG. 4 shows that the RMW process to process one physical sector containing a logical sector number preceding a logical sector number at the data access start position is necessary.

Case (2) of FIGS. 6A and 6B shows a data copy process of a memory of the device driver in the RMW process. The device driver receives record data from the application in the data recording process. The received record data is recorded on a first memory area M1 accessible in the device driver shown in the case (2) of FIG. 6A and identical to the data shown in the case (1) of FIG. 6A. The device driver selects, from the received data, data required for the RMW process and stores the selected data onto a RMW memory (buffer) M2. Data received from a controller on the information recording medium (HDD) is stored beforehand onto the RMW memory by physical sector unit. Logical sector data corresponding to that physical sector is subsequently selected from the first memory area M1 and copied in an inter-memory copy process, thereby overwriting at least part of the sector data of the physical sector unit received from the controller of the information recording medium (HDD) for updating. The data of the physical sector unit containing the updated data is output to the information recording medium (HDD).

Using the RMW memory, the device driver performs the process on data labeled D1 of the data of the cases (1) and (2) of FIG. 6A as a target of the RMW process. The device driver outputs the remaining data, namely, data labeled D2 which is not a target the RMW process, from the first memory area M1 to the information recording medium (HDD) directly rather than via the RMW memory.

A process of the device driver is described below with reference to FIG. 7. In step S51, the device driver determines a read logical sector address (LBA) for the RMW process. The LBA corresponds to LBA1 in the RMW memory (buffer) M2 of the case (2). More specifically, the device driver determines the logical sector address (LBA) corresponding to the start position of the physical sector unit. In step S52, the device driver reads data of N sectors from the determined LBA (LBA1) on the recording medium. N is the logical sector count contained in one physical sector. In the example of FIGS. 6A and 6B, N=2, and data of two logical sectors, namely, data of one physical sector is read and stored onto the RMW memory (buffer) M2.

In step S53, an updating process based on the data received from the application is performed on the data of one physical sector recorded on the RMW memory (buffer) M2. This process is performed as the inter-memory copy process discussed with the case (2) of FIG. 6A. In step S54, the updated content on the RMW buffer is recorded on the medium. The data D2 of FIG. 6A, which is not a target of the RMW process, is recorded on the medium. The data recording process is thus performed.

Figure 9:
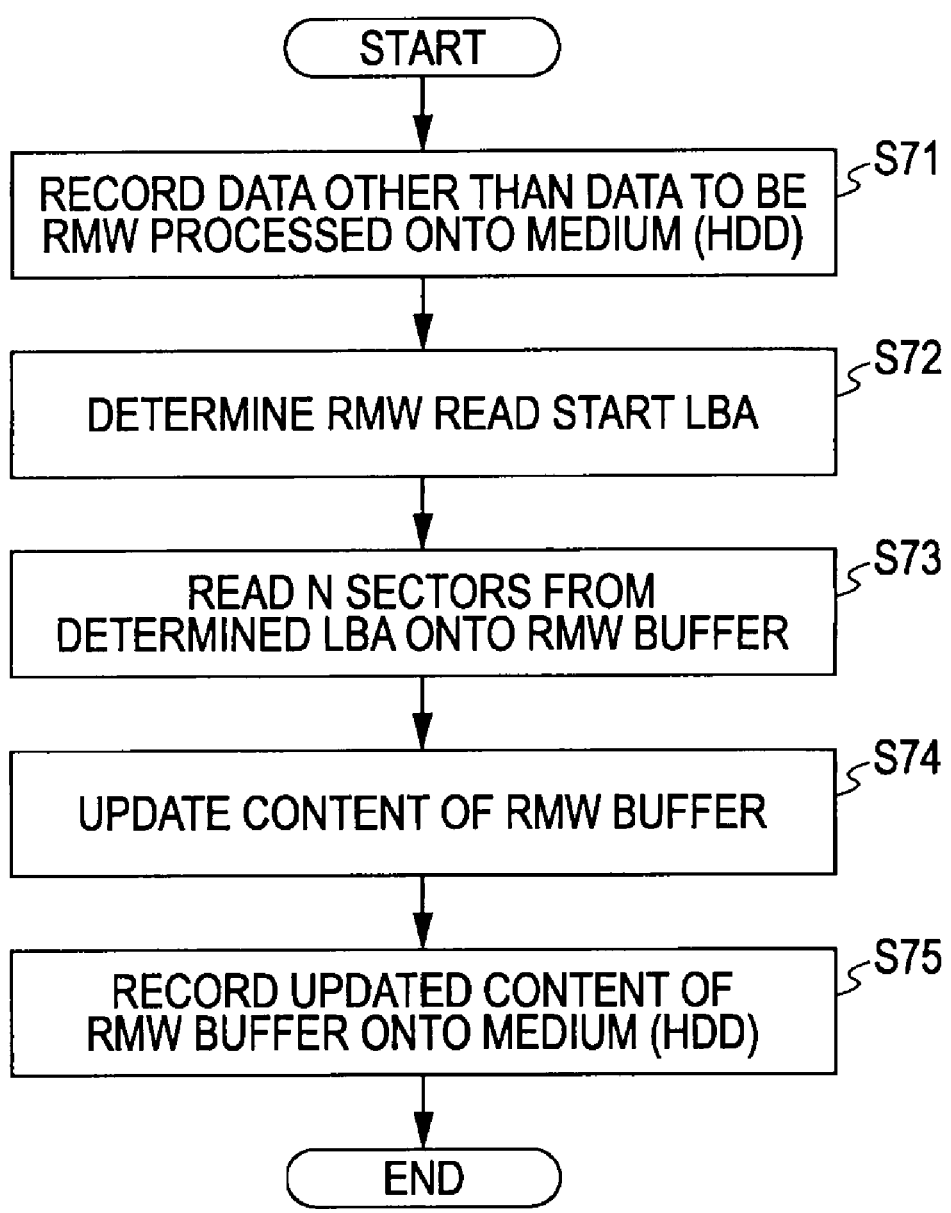
FIG. 9 is a flowchart illustrating a sequence of the RMW process.

The data recording process containing the RMW process in the case (B-b) of FIG. 4 is described below with reference to FIGS. 8A and 8B and 9. Case (1) of FIG. 8A, identical to the case (B-b) of FIG. 4, shows that the RMW process to process one physical sector containing a logical sector number subsequent to a logical sector number at the data access end position is necessary.

Case (2) of FIG. 8A shows a data copy process of a memory of the device driver in the RMW process. The device driver receives record data from the application in the data recording process. The received record data is recorded on a first memory area M1 accessible in the device driver shown in the case (2) of FIG. 8A and identical to the data shown in the case (1) of FIG. 8A. The device driver selects, from the received data, data required for the RMW process and stores the selected data onto a RMW memory (buffer) M2. Data received from a controller on the information recording medium (HDD) is stored beforehand onto the RMW memory by physical sector unit. Logical sector data corresponding to that physical sector is subsequently selected from the first memory area M1 and copied in the inter-memory copy process, thereby overwriting at least part of the sector data of the physical sector unit received from the controller of the information recording medium (HDD) for updating. The data of the physical sector unit containing the updated data is output to the information recording medium (HDD).

Using the RMW memory, the device driver performs the process on data labeled D1 of the data of the cases (1) and (2) of FIG. 8A as a target of the RMW process. The device driver outputs the remaining data, namely, data labeled D2 which is not a target the RMW process, from the first memory area M1 to the information recording medium (HDD) directly rather than via the RMW memory.

A process of the device driver is described below with reference to FIG. 9. In step S71, the device driver records on the medium the data D2 of FIG. 8, which is not a target of the RMW process. The data recording process is thus performed. In step S72, the device driver determines a read logical sector address (LBA) for the RMW process. The LBA corresponds to LBA1 in the RMW memory (buffer) M2 of the case (2) of FIG. 8A. More specifically, the device driver determines the logical sector address (LBA) corresponding to the start position of the physical sector unit. In step S73, the device driver reads data of N sectors from the determined LBA (LBA1) on the recording medium. N is the logical sector count contained in one physical sector. In the example of FIG. 8B, N=2, and data of two logical sectors, namely, data of one physical sector is read and stored onto the RMW memory (buffer) M2.

In step S74, an updating process based on the data received from the application is performed on the data of one physical sector recorded on the RMW memory (buffer) M2. This process is performed as the inter-memory copy process discussed with the case (2) of FIG. 8A. In step S75, the updated content on the RMW buffer is recorded onto the medium. The recording process is thus preformed.

In the case (C) of FIGS. 4 and 5A and 5B, both the RMW process at the data access start position discussed with reference to FIGS. 6A and 6B and 7 and the RMW process at the data access end position are performed.

The information processing apparatus of one embodiment of the present invention is described below in terms of structure and process. The information processing apparatus records data onto an information recording medium and reproduces data from the information recording medium. The information processing apparatus is one of a digital video camera and a personal computer, for example.

Figure 10:
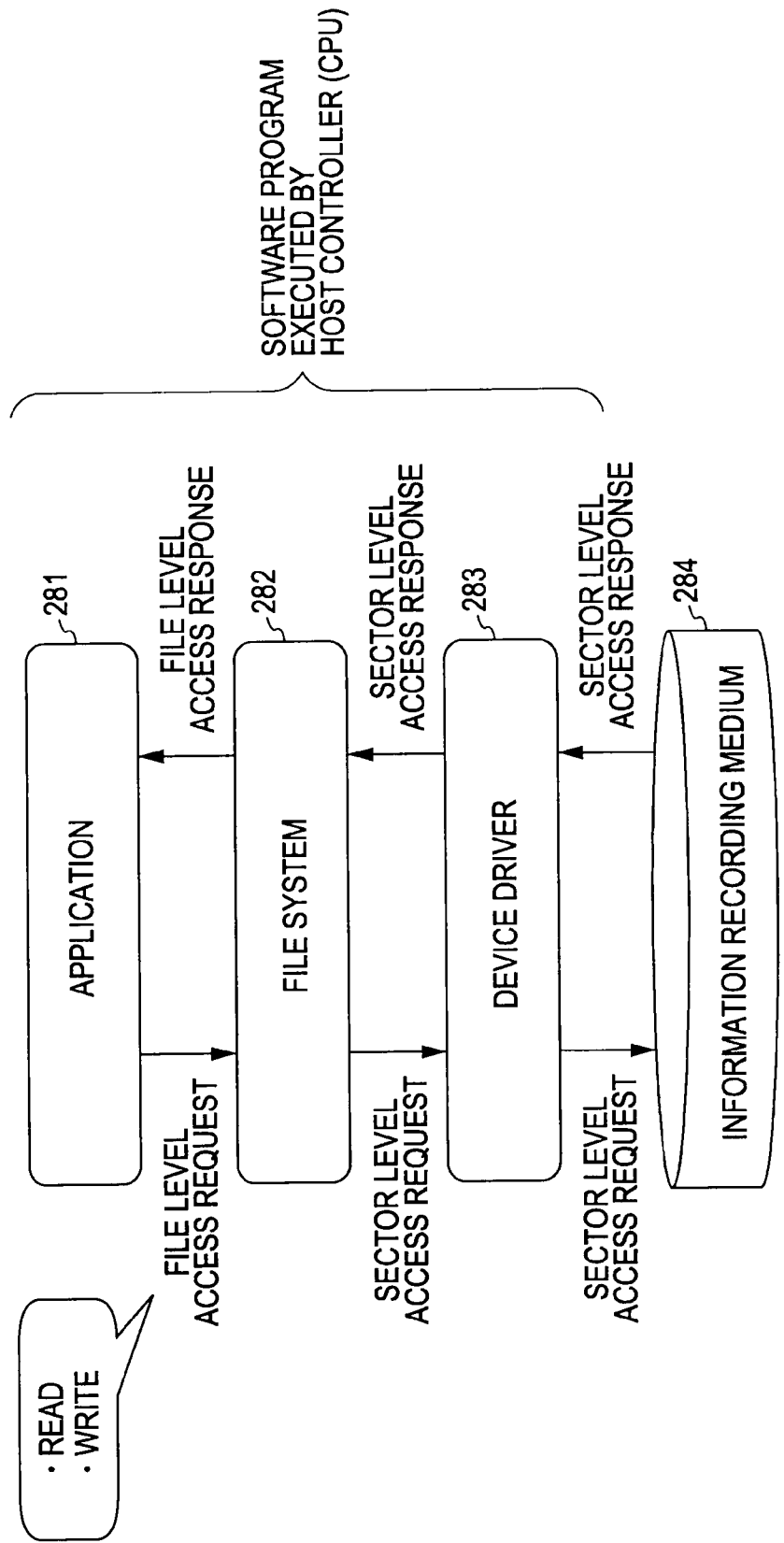
FIG. 10 illustrates a system configuration of an information processing apparatus in accordance with one embodiment of the present invention.

The information processing apparatus is generally described with reference to FIGS. 10 and 11. FIG. 10 illustrates the layer structure of the information processing apparatus that writes data onto or reads data from an information recording medium 284 such as a hard disk. An application program 281 is present at the topmost layer. When data is recorded on the information recording medium 284 or data is read from the information recording medium 284, the application program 281 receives a corresponding process request. The application program 281 communicates with the user by providing a user interface. Arranged under the application program 281 are a file (management) system 282 for managing a file on the information recording medium 284 and a device driver 283 for controlling the information recording medium 284 based on information from the file system 282.

When data is recorded onto the information recording medium 284 or data is reproduced from the information recording medium 284, a corresponding request is transferred to each of the file system 282 and the device driver 283. Data writing or data reproducing is thus performed based on the functions of the file system 282 and the device driver 283. The data writing process and the data reproducing process are thus performed using the file system, the device driver and the information recording medium (hard disk).

If a plurality of different files are used as continuation record files in data recording, a special code is recorded onto a file allocation table (FAT) applied by the file system 282. If a plurality of different files are used as continuation record files in data reproducing, file switching is performed on condition that a special code is detected from the FAT.

Figure 11:
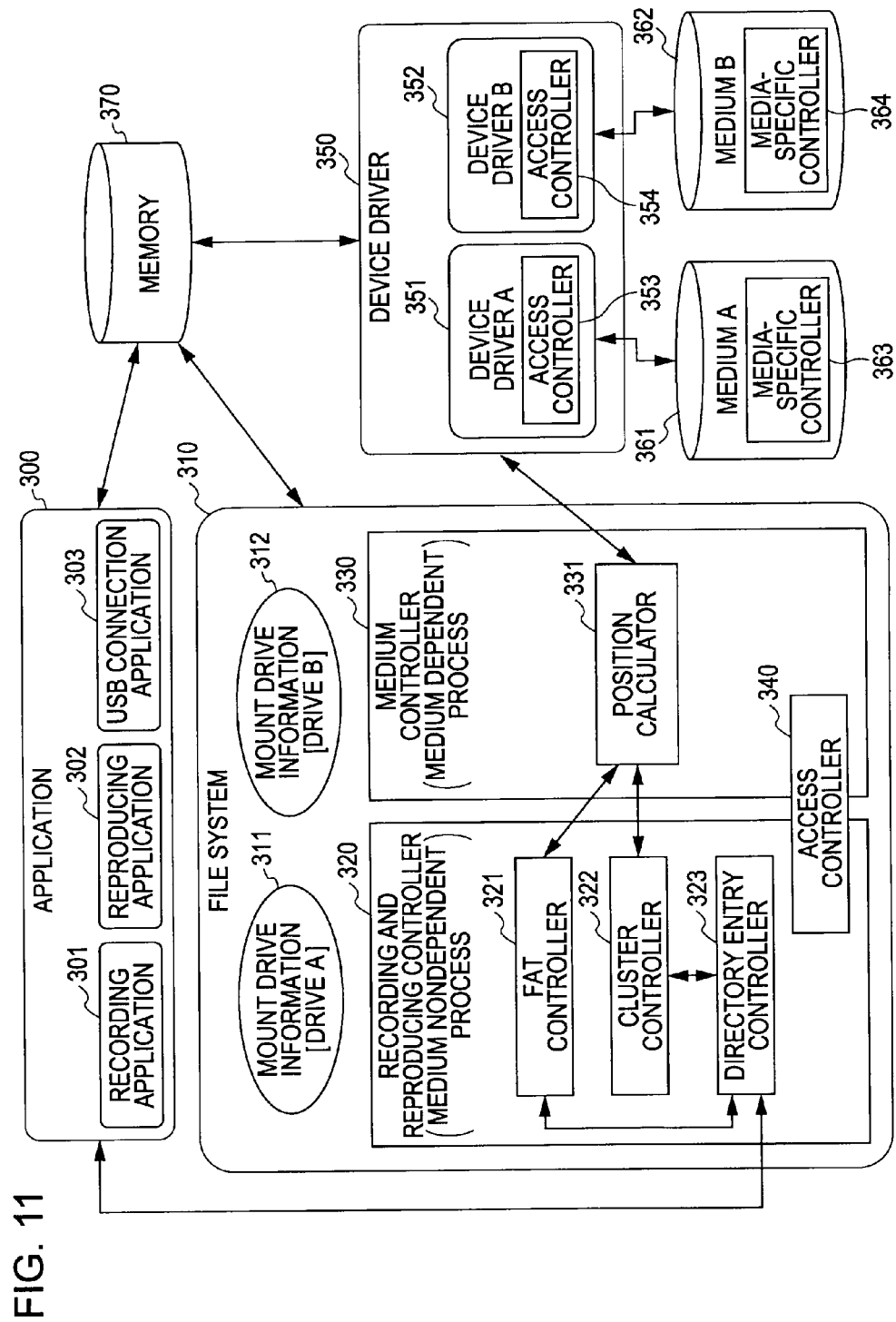
FIG. 11 illustrates a system configuration of an information processing apparatus in accordance with one embodiment of the present invention.

FIG. 11 illustrates more in detail a file system of the system configuration of FIG. 10. As FIG. 10, FIG. 11 illustrates a system configuration of the information processing apparatus that records data onto, retrieves data from the information recording medium and reproduces data from the information recording medium. The information processing apparatus thus records data onto an information recording medium 361 and an information recording medium 362, such as a hard disk and a flash memory, respectively.

As FIG. 10, FIG. 11 shows an application 300, a file system 310 and a device driver 350, both under the application 300. The file system 310 manages files on the information recording medium 361 and the information recording medium 362. The device driver 350 controls the information recording medium 361 and the information recording medium 362 in response to information from the file system 310. FIG. 11 illustrates two information recording media 361 and 362. For example, the information recording medium 361 and the information recording medium 362 are a hard disk and a flash memory in which the logical sector unit and the physical sector unit fail to match each other. The device drivers 350 include a device driver A 351 and a device driver B 352 respectively corresponding to the information recording media 361 and 362.

The application 300, the file system 310 and the device driver 350 access a memory 370 to store programs and parameters required for processes of each element and use the memory 370 as a work area for data processing. For example, the first memory area M1 and the RMW memory (buffer) M2 discussed with reference to FIGS. 6A and 8A are arranged in the memory 370.

The application 300 includes a recording application 301, a reproducing application 302 and a USB connection application 303. The recording application 301 performs a data recording process on the information recording media 361 and 362. The reproducing application 302 reproduces data recorded on the information recording media 361 and 362. The USB connection application 303 performs a connection process with an external device. The user can select one of these applications to perform a corresponding process.

The file system 310 stores mount drive information 311 and 312, supporting respective storage media, such as the type of a storage medium and format information and performs the data recording process and data reproducing process using the information recording medium such as a hard disk. The file system 310 includes a recording and reproducing controller 320 performing data recording and reproducing process and a medium controller 330 controlling media. The process performed by the recording and reproducing controller 320 is common to medium nondependent type medium, and the process performed by the medium controller 330 is a medium dependent process.

The recording and reproducing controller 320 includes a file allocation table (FAT) controller 321, a cluster controller 322 and a directory entry controller 323. The FAT controller 321 records and references a FAT. The cluster controller 322 performs a cluster determination process of a cluster as data recording position information and a reproducing position determination process based on a cluster number. The directory entry controller 323 generates and references a directory entry (see FIG. 3) containing information responsive to a file. The directory entry controller 323 acquires a directory entry responsive to a particular file based on storage means designating information and file designating information from the application 300. For example, to reproduce a file, the directory entry controller 323 acquires a head cluster number from the directory entry and supplies the acquired head cluster number to the cluster controller 322.

The medium controller 330 includes a position calculator 331. Based on the cluster information and cluster concatenation information of FAT, each determined by the cluster controller 322, the medium controller 330 controls the device driver 350 thereby determining a data recording position and a data reproducing position on a disk according to a cluster number. In accordance with the determined position information, the medium controller 330 records data onto or reproduces data at the disk position via the device driver 350.

An access controller 340 in the file system 310 performs an access control process on the storage means in response to the application. The access controller 340 performs the access control process in each of the recording and reproducing controller 320 performing the medium nondependent process and the medium controller 330 performing the medium dependent process. The device driver A 351 and the device driver B 352 respectively include and an access controller 353 and an access controller 354. The device driver A 351 and the device driver B 352 under the respective controllers perform the access control process including the previously discussed RMW process.

The information recording media 361 and 362 respectively include a medium-specific controller 363 and a medium-specific controller 364, each performing the data recording process and the data reproducing process on the medium. For example, the medium-specific controller 363 of the information recording medium 361 such as a hard disk accesses data on the hard disk by physical sector unit.

Figure 12:
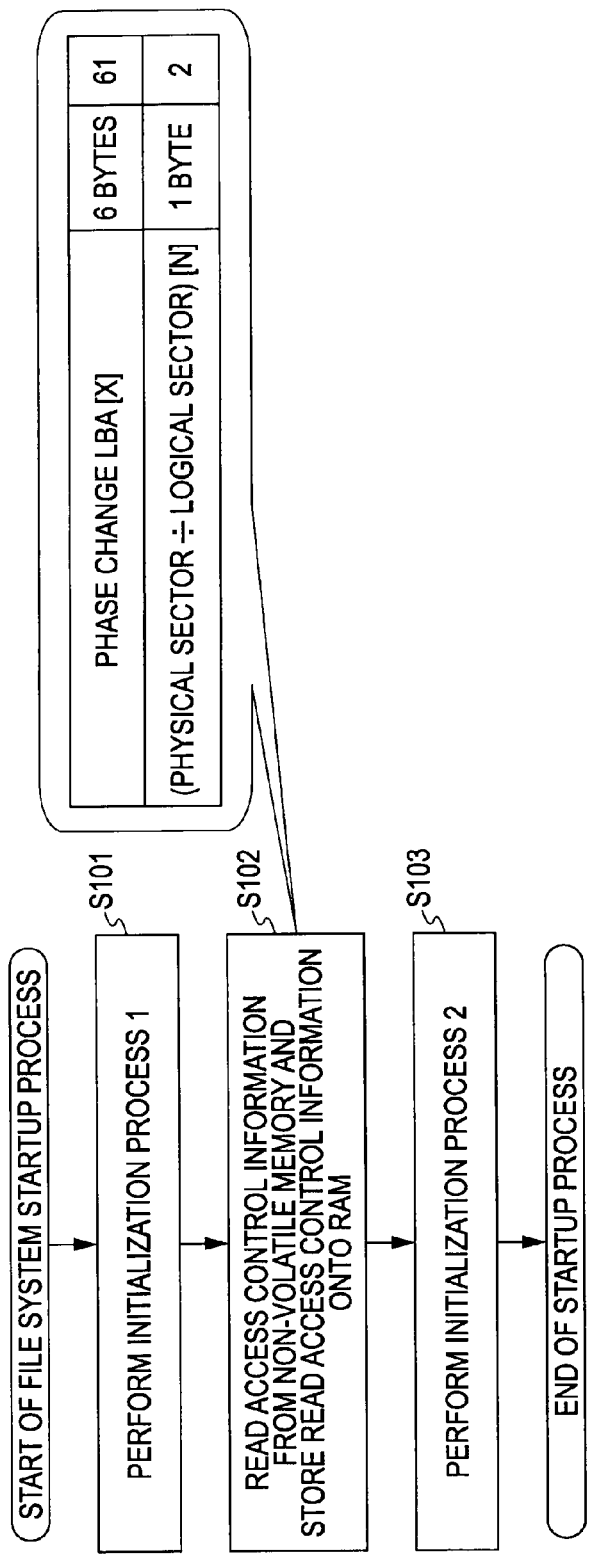
FIG. 12 is a flowchart illustrating a file system startup process of the information processing apparatus in accordance with one embodiment of the present invention.
Figure 13:
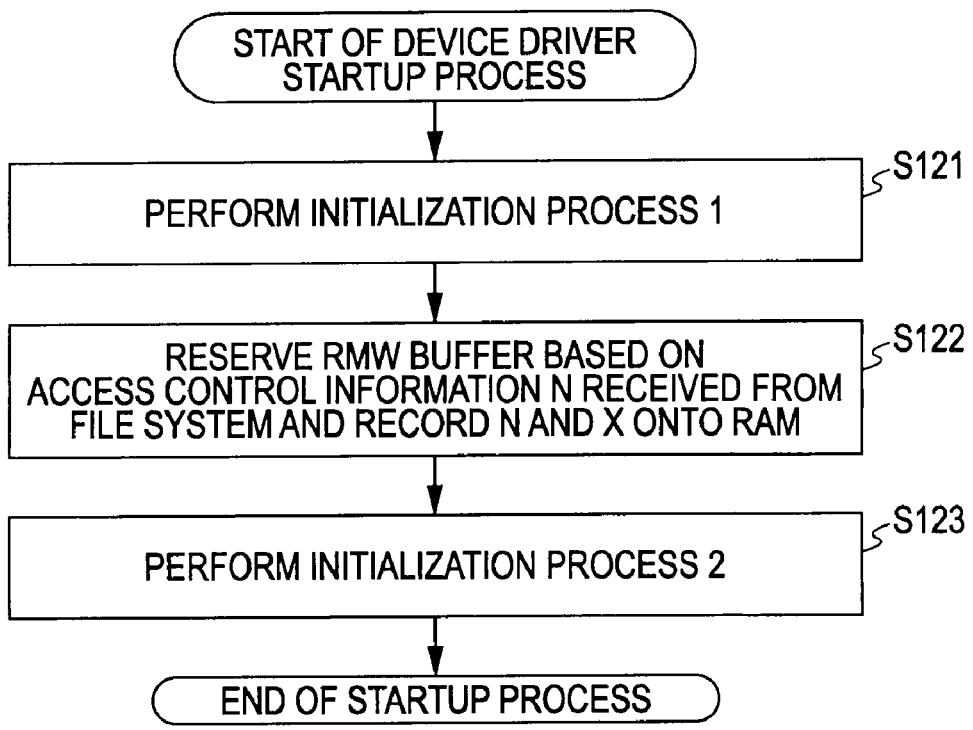
FIG. 13 is a flowchart illustrating a device driver startup process of the information processing apparatus in accordance with one embodiment of the present invention.

A variety of processes performed by the information processing apparatus of embodiments of the present invention are described below with reference to FIGS. 12 through 20. With reference to FIGS. 12 and 13, startup processes of the file system and the device driver are respectively described below.

The startup processes are executed at the startup of the information processing apparatus. The startup process of the file system is described below with reference to FIG. 12. In step S101, an initialization process 1 is performed. In the initialization process, a type of a loaded medium is determined and then format information of the determined medium is acquired. In step S102, access control information pre-recorded on a non-volatile memory is stored onto an accessible memory area (part of the RAM of FIG. 11, for example) of the file system.

As previously discussed with reference to FIG. 1 and other figures, the access control information pre-recoded on the non-volatile memory includes the phase change point X and the logical sector count of the logical sectors contained in one physical sector N. In step S103, an initialization process 2 is performed. In the initialization process 2, a final process is performed to a command input waiting state waiting for a command from an application at an upper layer. The command from the application at the upper layer is input and a process responsive to the input command is thus performed.

The startup process of the device driver is described below with reference to FIG. 13. In an initialization process in step S121, a type of a loaded medium is determined and format information of the determined medium is acquired. In step S122, a RMW buffer is reserved in accordance with the logical sector count N of one physical sector, and stores the values of the phase change point X and the logical sector count N onto an accessible memory area of the device driver (for example, onto part of the RAM of FIG. 11).

In an initialization process 2 in step S123, a final process is performed to a command input waiting state waiting for a command from an application at an upper layer. The command is input from the application at the upper layer and a process responsive to the input command is thus performed.

The read-modify-write (RMW) process of the device driver is described in detail in reference to FIGS. 14 through 20.

Figure 14:
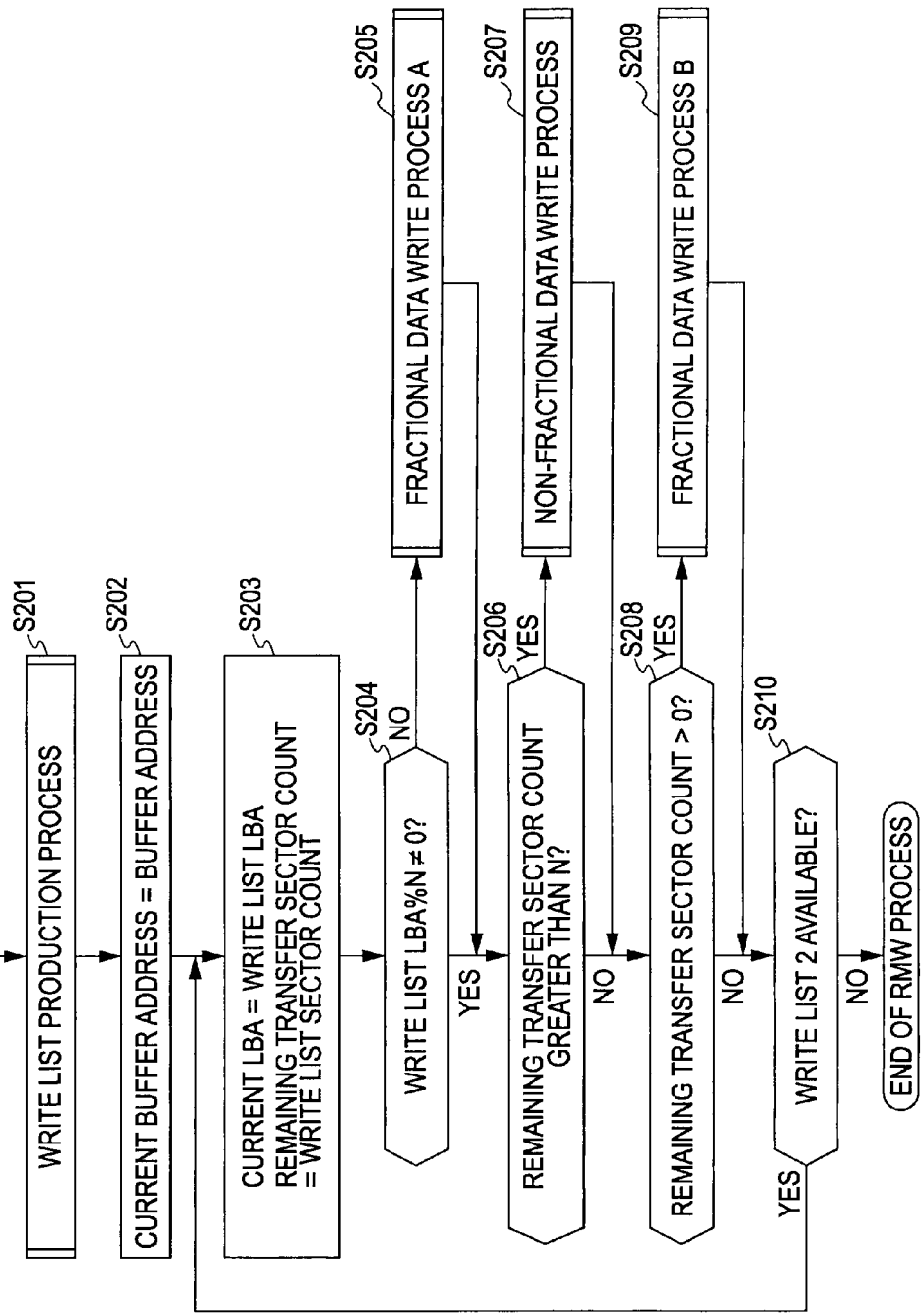
FIG. 14 is a flowchart illustrating a data recording process including the RMW process of the information processing apparatus in accordance with one embodiment of the present invention.

FIG. 14 is a flowchart generally illustrating the data writing process including the RMW process performed under the control of the access controller of the device driver. Detailed sequences of processes of FIG. 14 are illustrated in FIGS. 15 through 20.

Figure 15:
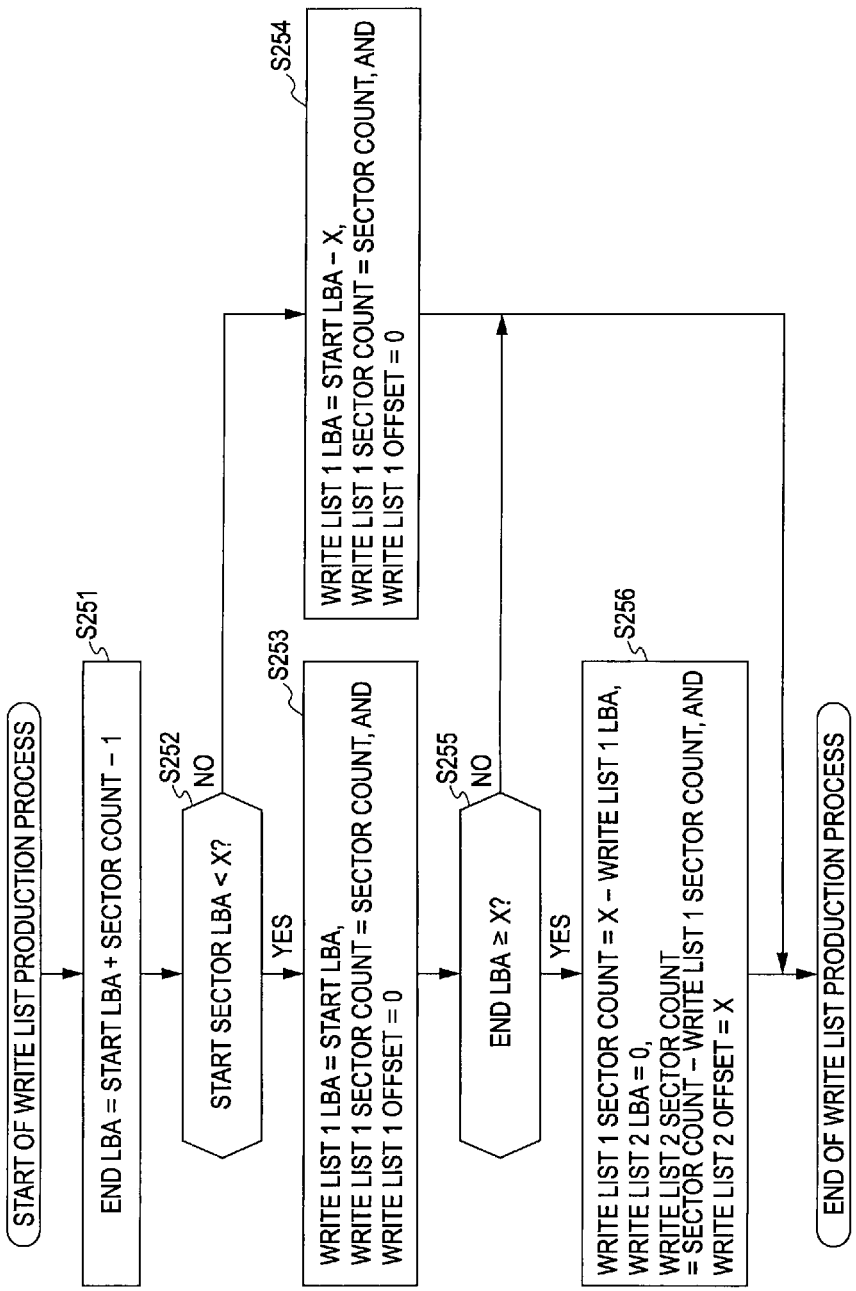
FIG. 15 is a flowchart illustrating a write list production process performed in step S201 of FIG. 14.

More specifically, a write list production process in step S201 of FIG. 14 is described in a flowchart of FIG. 15.

Figure 16:
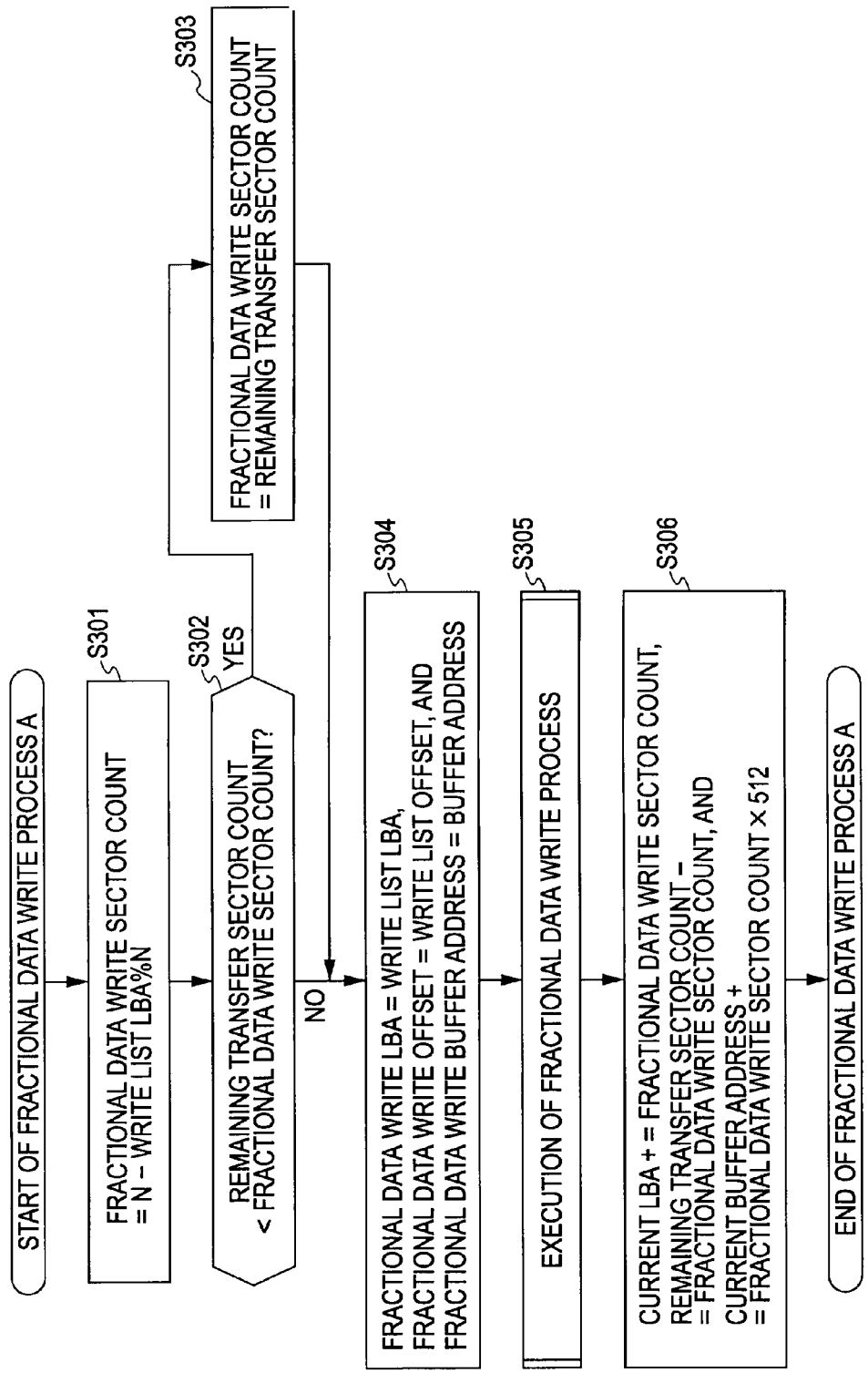
FIG. 16 is a flowchart illustrating a fractional data write process A performed in step S205 of FIG. 14.

A fractional data write process A in step S205 of FIG. 14 is described in a flowchart of FIG. 16.

Figure 17:
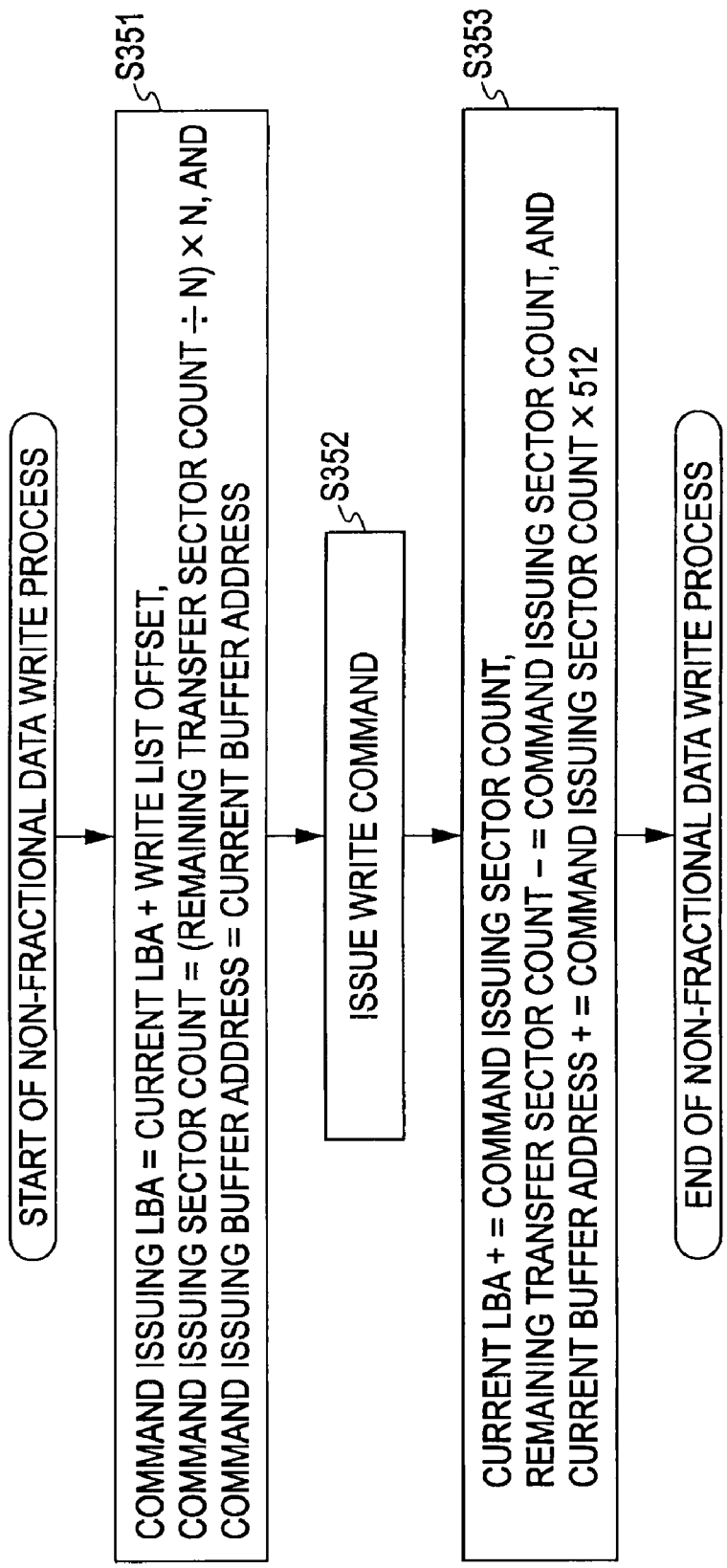
FIG. 17 is a flowchart illustrating a non-fractional data write process performed in step S207 of FIG. 14.

A non-fractional data write process in step S207 of FIG. 14 is described in a flowchart of FIG. 17.

Figure 18:
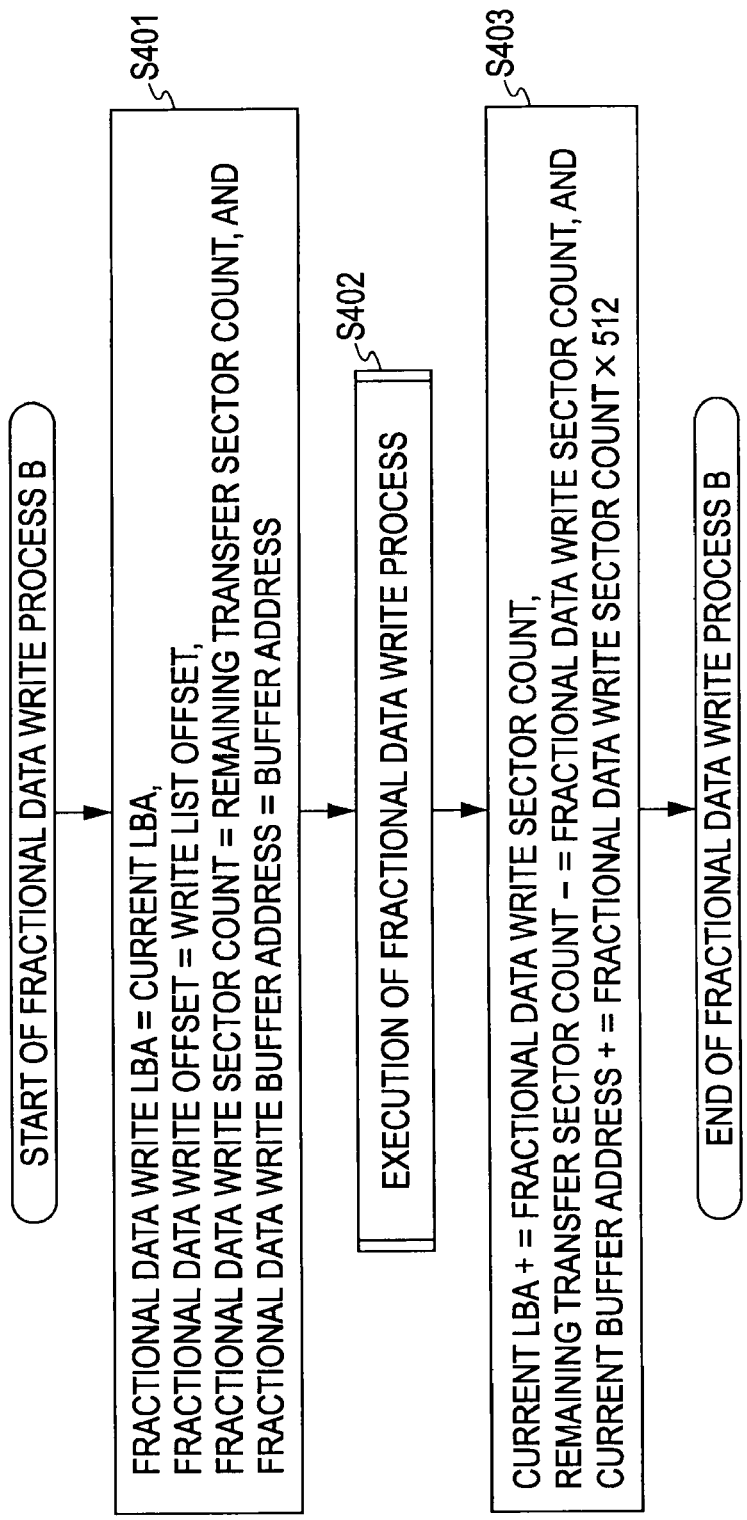
FIG. 18 is a flowchart illustrating a fractional data write process B performed in step S209 of FIG. 14.

A fractional data write process B in step S209 of FIG. 14 is described in a flowchart of FIG. 18.

In accordance with the flowchart of FIG. 14, each process step is described. In step S201, the device driver produces a write list. The write list is set up for the record data on the information recording medium and lists a write start LBA received from the application and a write sector count. As previously discussed with reference to FIGS. 6A and 6B and FIGS. 8A and 8B, the device driver can use the first memory area M1 storing write data received from the application and the RMW memory (buffer) M2 storing data by physical sector unit.

The write list production process in step S201 is described in detail with reference to the flowchart of FIG. 15. In the recording process of the record data from the application, the access controller generates, as a management information list for the record data, a write list listing a logical block address (LBA) for the record data, a sector count as the number of sectors of the record data and offset information of the logical sector number. The access controller then performs the recording process in accordance with the write list.

In step S251, the device driver calculates the write end LBA from the write start LBA and the write sector count received from the application. This calculation is performed in accordance with the equation of write end LBA=(write start LBA+write sector count−1).

In step S252, the device driver compares the start sector LBA and the phase change point X to determine whether the start sector LBA is smaller than (<) the phase change point X.

If it is determined in step S252 that the start sector LBA is smaller than the phase change point X, processing proceeds to step S253. In step S253, the write list is set to be as follows:

first write list (write list 1) LBA=start sector (LBA),
first write list (write list 1) sector count=received sector count, and
first write list (write list 1) offset=0.

If it is determined in step S252 that the start sector LBA is not smaller than the change phase point X, processing proceeds to step S254. In step S254, the write list is set to be as follows:

first write list (write list 1) LBA=start sector (LBA)−X,
first write list (write list 1) sector count=sector count, and
first write list (write list 1) offset=X.

If the write start sector is prior to the phase change point X, the settings of the write start LBA and the write sector count received from application are directly used as the settings of the first write list in step S253. If the write start sector is subsequent to the phase change point X, the settings of the first write list are set so that the write start LBA received from the application is adjusted by the value of the phase change point X as follows:

first write list (write list 1) LBA=start sector (LBA)−X, and
first write list (write list 1) offset=X.

Furthermore, if the write start sector is prior to the phase change point X, the device driver determines in step S255 subsequent to step S253 whether the write end LBA is equal to or greater than the phase change point. If it is determined in step S255 that the write end LBA is equal to or greater than the phase change point X, the first write list is updated and a second write list (write list 2) is generated in step S256 as follows:

first write list (write list 1) sector count=X−first write list LBA,
second write list (write list 2) LBA=0,
second write list (write list 2) sector count=sector count−first write list (write list 1) sector count=sector count, and
second write list (write list 2) offset=X.

If the write start sector is prior to the phase change point X and the write end sector is subsequent to the phase change point X, the first write list is used for write data prior to the phase change point X and the second write list is used for write data subsequent to the phase change point X. Thus, the two write lists are produced.

If it is determined in step S255 that the write end LBA is neither equal to nor greater than the phase change point X, only the first write list is generated with step S256 skipped.

For example, if the data received from the application is the write start LBA=30, the write sector count=200 and the phase change point X=61 as shown in FIG. 1, the two lists, namely, the first write list and the second write list are produced. The following data is set in each of the two lists:

first write list:
(a) first write list LBA=30
(b) first write list sector count=X−30
(c) first write list offset=0 second write list:
(a) second write list LBA=0
(b) second write list sector count=200−(X−30)
(c) second write list offset=X Processing proceeds to step S202 of FIG. 14 after the write list has been generated. In step S202, an initial setting is performed so that an address at a start position of the head of the write data stored on the first memory area M1 is set to be a current buffer address. In step S203, the write start address LBA of the write list is set to be a current LBA and the write sector count of the write list is set to be a remaining sector count.

If the second write list is present in addition to the first write list, the first write list is used first.

In step S204, the device driver determines whether the logical sector (LBA) of the write list is divisible by the logical sector count N of one physical sector.

"Write list LBA % N" represents a quotient resulting from dividing the write list LBA by N. If the logical sector is divisible by N, processing proceeds to step S206. If the logical sector is not divisible by N, processing proceeds to step S206 after performing a fractional data write process A in step S205.

The fractional data write process A is performed in step S205 if it is determined in step S204 that the logical sector (LBA) of the write list is not divisible by the logical sector count N of one physical sector. More specifically, the fractional data write process A is performed when the start position of the write data becomes a target of the RMW process.

The fractional data write process A in step S205 is described below with reference to the flowchart of FIG. 16. The fractional data write process A is a write process of a logical sector portion where the write data of the logical sector data of physical sector unit is not accepted by the application.

The device driver calculates the fractional data write sector count in accordance with the following equation in step S301 of FIG. 16:

fractional data sector count=$N$−(Write list LBA % $N$)

In accordance with this equation, the count of sectors received from the application contained in the data D1 of FIG. 6A are determined.

In step S302, the device driver determines whether the remaining transfer sector count is smaller than the fractional data write sector count. Step S302 is performed to determine whether the remaining transfer sector count is smaller than the fractional data write sector count calculated in step S301. If it is determined that the remaining transfer sector count is not smaller than the fractional data write sector count, processing proceeds to step S304. If it is determined that the remaining transfer sector count is smaller than the fractional data write sector count, processing proceeds to step S303. After setting the fractional data write sector count=the remaining transfer sector count, processing proceeds to step S304.

In step S304, the fractional data write setting is performed as follows:
fractional data write LBA=write list LBA,
fractional data write offset=write list offset, and
fractional data write buffer address=buffer address.

Step S304 is performed to set a relationship between data for the fractional data write process and data on the write list.

In step S305, the fractional data write process, i.e., the data write process containing the RMW process is performed. Step S305 will be described in detail later with reference to FIG. 19.

After performing the fractional data write process, i.e., the data write process containing the RMW process in step S305, the data updating process is performed as follows:
current LBA+=fractional data write sector count,
remaining transfer sector count−=fractional data write sector count, and
current buffer address+=fractional data write sector count× 512.

More specifically, the current LBA is increased by a the fractional data write sector count, the remaining transfer sector count is decreased by the fractional data write sector count and the current buffer address is increased by the fractional data write sector count×512. Here one logical sector is 512 bytes and the address is set as byte data.

When fractional data write process A is complete, processing proceeds to step S206. The device driver determines whether the remaining transfer sector count is N, namely, the logical sector count N of one physical sector. If the remaining transfer sector count is less than N logical sectors, processing proceeds to step S208. If the remaining transfer sector count is equal to or greater than N, processing proceeds to step S208 after the non-fractional data write process in step S207.

The non-fractional data write process in step S207 corresponds to the write process of data D2 of FIG. 6. In other words, the non-fractional data write process is a data write process of a portion where data writing can be performed by receiving the write data from the application by physical sector unit.

The non-fractional data write process in step S207 is described below with reference to the fractional data write sector count of FIG. 17. The non-fractional data write process is a data record process not including the RMW process and performed for a data period within which the write data is received from the application by physical sector unit.

In step S351, commands for the data recording process are set as follows:
command issuing LBA=current LBA+write list offset,
command issuing sector count=(remaining transfer sector count+N)×N, and
command issuing buffer address=current buffer address.

During the data period within which the data writing by physical sector unit is possible, the command issuing LBA for the logical sector, the command issuing sector count and the command issuing buffer address are set in order to transfer data to the medium (HDD). The medium (HDD) performs the data writing on the medium using the first memory area M1 of FIG. 6A as a buffer. In step S352, a write command is used in accordance with the information set in step S351 and the data writing is performed by physical sector unit. With this process, the data writing by physical sector is continuously performed depending on the remaining transfer sector count.

In step S353 subsequent to the write process, information updating responsive to the write data is performed as follows:
current LBA+=command issuing sector count,
remaining transfer sector count−=command issuing sector count, and
current buffer address+=command issuing sector count× 512.

More specifically, the current LBA is increased by the command issuing sector count, the remaining transfer sector count is decreased by the command issuing sector count and the current buffer address is increased by the command issuing sector count×512. Here, one logical sector is 512 bytes and the address is set as byte data.

When the non-fractional data write process is complete, processing proceeds to step S208 of FIG. 14. The device driver determines whether the remaining transfer sector count is greater than zero. If it is determined in step S208 that the remaining transfer sector count is zero, processing proceeds to step S210. If it is determined in step S208 that the remaining transfer sector count is greater than zero, processing proceeds to step S210 after the faction number write process B in step S209.

The faction number write process B in step S209 corresponds to the write process of the data D1 of FIG. 8A. The fractional data write process is a data record process including the RMW process and performed when the write data is not received from the application by physical sector unit at the data record end position.

The faction number write process B in step S209 is described below with reference to a flowchart of FIG. 18. The faction number write process B is performed as a data recording process including the RMW process discussed with reference to FIG. 8A with the write data not received from the application by physical sector unit.

In step S401, the fractional data write setting is performed as follows:
fractional data write LBA=current LBA,
fractional data write offset=write list offset,
fractional data write sector count=remaining transfer sector count, and
fractional data write buffer address=buffer address.

Step S401 is performed to set a relationship between data for performing the fractional data write process and data on the write list.

In step S402, the fractional data write process, namely, the data write process including the RMW process is performed. The process in step S402 will be described later with reference to FIG. 19.

After the fractional data write process, namely, the data write process including the RMW process performed in step S402, data updating is performed as follows:
current LBA+=fractional data write sector count,
remaining transfer sector count−=fractional data write sector count, and
current buffer address+=fractional data write sector count× 512.

More specifically, the current LBA is increased by the fractional data write sector count, the remaining transfer sector count is decreased by the fractional data write sector count and the current buffer address is increased by the fractional data write sector count×512. Here one logical sector is 512 bytes and the address is set as byte data.

When fractional data write process B is complete, processing proceeds to step S210 of FIG. 14. The device driver determines whether a second write list is present. If it is determined in step S210 that a second write list is present, processing returns to step S203. Step S203 and subsequent steps are performed on the second write list.

If the fractional data is present at each of the data record start position and the data record end position, the data recording process including the RMW process is performed in each of the fractional data write process A and the fractional data write process B.

The fractional data write process in each of step S305 of FIG. 16 and step S402 of FIG. 18 is described below with reference to the flowchart of FIG. 19.

In step S451 of the fractional data write process, the fractional data write start LBA is set in accordance with the following equation:

fractional data write start LBA=fractional data write LBA+fractional data write offset.

The LBA immediately prior to the phase change is calculated in accordance with the following equation:

LBA immediately prior to phase change=$(X \div N) \times N$ $(X \div N)$ means that an integer part of the quotient that is determined by dividing the phase change point X by the logical sector count N contained in one physical sector. For example, with N=2 and X=61 as shown in FIG. 1, $(X \div N)$=30. LBA immediately prior to the phase change point=$(X \div N) \times N$=30×2=60. LBA immediately prior to the phase change point is 60.

In step S452, LBA immediately prior to the phase change point, the fractional data write start LBA and the phase change point X are compared. If comparison equation of (LBA immediately prior to the phase change point)≦(fractional data write start LBA)<(phase change point X) holds, processing proceeds to step S455. If the comparison equation does not hold, processing proceeds to step S453.

The comparison equation holds in a special case in which the fractional data write start LBA is equal to or greater than the LBA immediately prior to the phase change and smaller than the phase change point X. Except such a special case, processing proceeds to step S453. In step S453, commands for the fractional data write process are set as follows:
command issuing LBA=(fractional data write LBA÷N)× N+fractional data write offset,
command issuing buffer address=RMW buffer address,
command issuing sector count=N,
modifying buffer address A=RMW buffer address+(fractional data write LBA % N)×512,
modifying buffer address B=fractional data write buffer address, and
modify size=fractional data write sector×512.

(Fractional data write LBA÷N) is an integer value resulting from dividing the fractional data write LBA by N.

The command issuing LBA is (fractional data write LBA÷N)×N+fractional data write offset and the command buffer address is the RMW buffer address. The RMW buffer corresponds to the RMW memory (buffer) M2 shown in FIGS. 6A and 8B.

A command issuing sector count is set to be N, which is the logical sector count for one physical sector. This means an execution of the data writing by physical sector unit. Furthermore, modifying buffer address A=RMW buffer address+ (fractional data write LBA % N)×512, and modifying buffer address B=fractional data write buffer address.

The modify buffer address A is an address A in the RMW memory (buffer) M2 of the case (2) of each of FIGS. 6A and 8A, for example. The modifying buffer address B is an address B in the first memory area M1 of the case (2) of each of FIGS. 6A and 8A. Furthermore, modify size=fractional data write sector×512 is set. Here, the logical sector is 512 bytes.

In step S454, the read-modify-write (RMW) process is performed. The RMW process is described with reference to the flowchart of FIG. 20. The RMW process has been discussed with reference to FIGS. 6A and 6B. The data read from the recording medium is stored on the RMW memory (buffer) M2 by physical sector unit and then data on the first memory area M1 is copied onto the RMW memory (buffer) M2 for data updating. The data is then recorded on the recording medium by physical sector unit.

In step S501, a physical sector containing a logical sector as a target of the RMW process is read, and then stored onto the RMW memory (buffer) M2 of FIGS. 6A and 8A. In step S502, data of a modify size is copied from a modify buffer address B to a modify buffer address A. In step S503, a write command is issued. Data updated on the RMW memory (buffer) M2 is recorded onto the recording medium by physical sector unit. Step S454 of FIG. 19 is thus performed.

Figure 19:
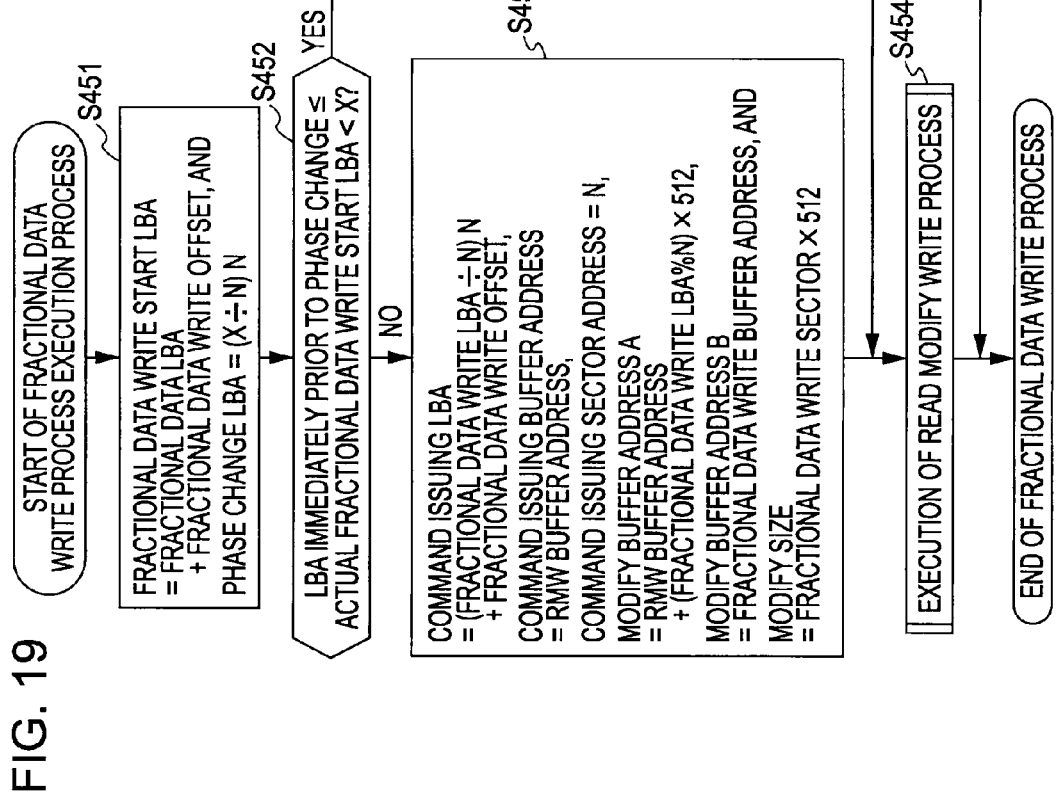
FIG. 19 is a flowchart illustrating a fractional data write process execution process.

If it is determined in step S452 of FIG. 19 that the comparison equation of (LBA immediately prior to the phase change point)≦(fractional data write start LBA)<(phase change point X) holds, processing proceeds to step S455. The comparison equation holds in a special case in which the fractional data write start LBA is equal to or greater than the LBA immediately prior to the phase change and smaller than the phase change point X. In such a special case, the device driver determines in step S455 whether the relationship of X−(LBA immediately prior to the phase change point)=(fractional data write sector count) holds.

If X=61 in FIG. 1, the LBA immediately prior to the phase change point is 60. The device driver determines whether the fractional data write sector count=61−60=1 holds.

If the relationship of X−(LBA immediately prior to the phase change point)=(fractional data write sector count) holds, the device driver sets commands for the fractional data write process in step S456. If the relationship of X−(LBA immediately prior to the phase change point)=(fractional data write sector count) does not hold, the device driver sets commands for the fractional data write process in step S458. More specifically, the commands to be set are changed depending on whether the fractional data write sector count is present immediately prior to the phase change point.

If the relationship of X−(LBA immediately prior to the phase change point)=(fractional data write sector count) holds, i.e., if the fractional data write sector count is present immediately prior to the phase change point, the setting of the commands for the fractional data write sector count is performed in step S456 as follows:

command issuing LBA=(fractional data write LBA÷N)× N+fractional data write offset, command issuing buffer address=RMW buffer address, and command issuing sector count=fractional data write sector count.

After setting these commands, the write command is executed in step S457. In this case, only the fractional data is written without performing the RMW process.

If the relationship of X−(LBA immediately prior to the phase change point)=(fractional data write sector count) does not hold, i.e., if the fractional data write sector count is not present immediately prior to the phase change point, the setting of the commands for the fractional data write sector count is performed in step S458 as follows:

command issuing LBA=(fractional data write LBA÷N)× N+fractional data write offset, command issuing buffer address=RMW buffer address, command issuing sector count=N, modify buffer address A=RMW buffer address+(fractional data write LBA % N)×512, modify buffer address B=fractional data write buffer address, and modify size=fractional data write sector×512.

Figure 20:
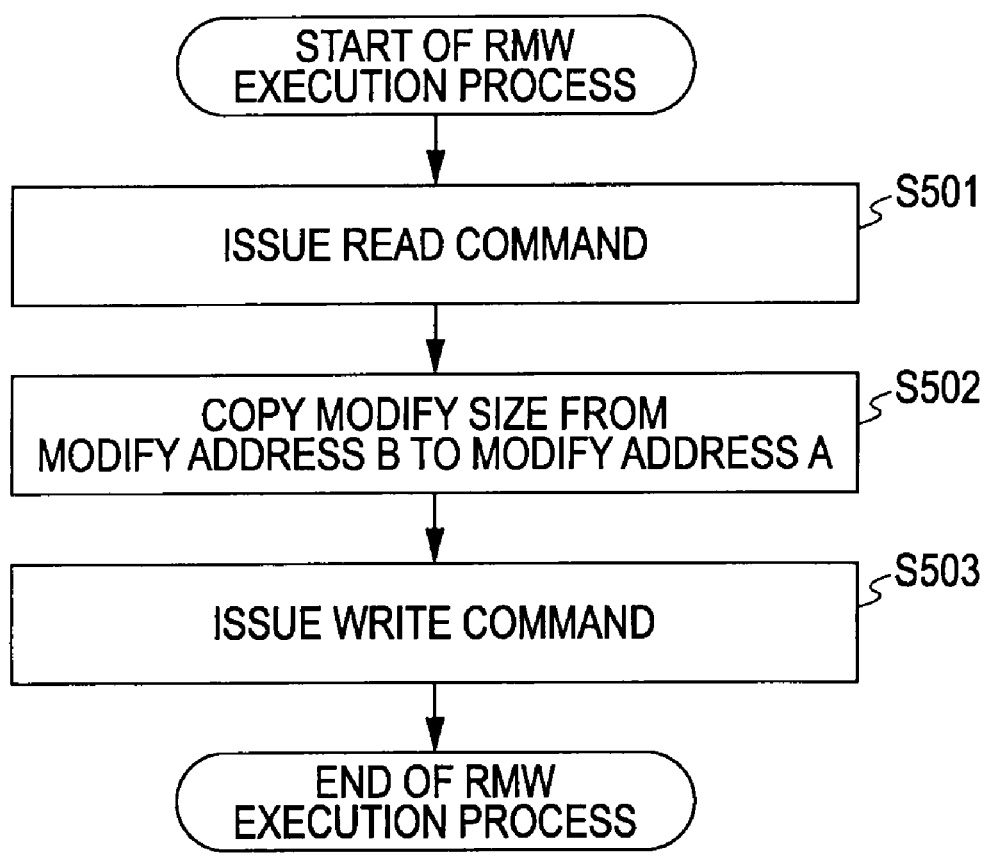
FIG. 20 is a flowchart illustrating a RMW process execution process.

Subsequent to these processes, the process in step S454, namely, the RMW process discussed with reference to FIG. 20 is performed.

The information processing apparatus of one embodiment of the present invention checks the record data transferred from the application to the device driver. If a fractional logical sector is present at one of a record start sector and a record stop sector, i.e., if part of data of the write data is missing by physical sector unit, the RMW process is performed except the special case in which the determination to step S435 of FIG. 19 is yes. In other words, the device driver retrieves data from the recording medium by physical sector unit, stores the retrieved data onto the RMW memory area, copies the logical sector data received from the application and updated, and outputs the data by physical sector unit to the recording medium.

The device driver in the information processing apparatus of one embodiment of the present invention includes the access controller for outputting to the media responsive controller the record data for the recording medium input from the application. The access controller performs the RMW process by verifying whether one of the record start position and the record end position of the record data input by the logical sector unit from the application is different from the delimitation position of the physical sector as the access unit of the recording medium managed by the medium-specific controller, acquiring the record data by the physical sector unit via the medium-specific controller and storing the record data onto the memory if one of the record start position and the record end position is different from the delimitation position, updating logical sector data as part of the stored physical sector data with the record data input by the sector unit from the application, and outputting the updated physical sector data to the medium-specific controller.

More specifically, based on a count of logical sectors N contained in one physical sector or based on a phase change point where phase changes in a correspondence relationship between the logical sector and the physical sector, the access controller verifies whether one of the record start position and the record end position of the record data input by the logical sector unit from the application is different from the delimitation position of the physical sector as the access unit of the recording medium managed by the medium-specific controller.

As previously discussed with reference to FIGS. 6A and 6B and 8A and 8B, the access controller copies in the RMW operation the logical sector data as a target of the RMW operation from a first memory area storing the record data input by the logical sector unit from the application to an RMW memory area.

The access controller generates, as a management information list of the record data, a write list listing a logical block address (LBA) for the record data, a sector count indicating the number of sectors of the record data and offset information of a logical sector number and records the record data input from the application with reference to the write list. The access controller generates a first write list of the record data prior to a phase change point X and a second write list of the record data subsequent to the phase change point X if the phase change point where phase changes in the correspondence relationship between the logical sector and the physical sector is present and if the record data input by the logical sector unit from the application extends across the phase change point.

Figure 21:
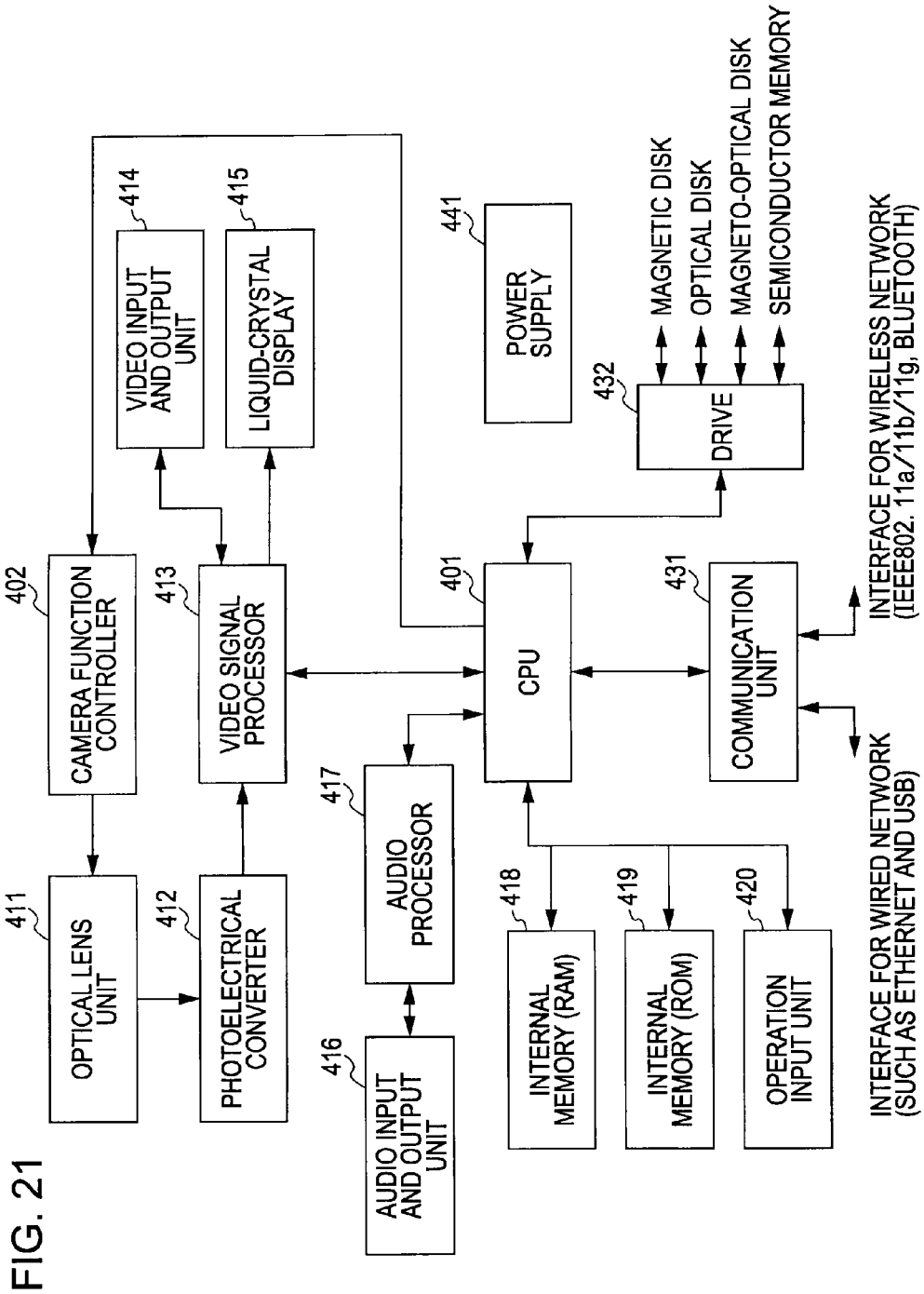
FIG. 21 illustrates a digital video camera in accordance with one embodiment of the present invention.

With reference to FIGS. 21 and 22, a digital video camera and a personal computer are described as examples of the information processing apparatus performing the above-referenced processes.

The digital video camera is described below with reference to FIG. 21. The digital video camera works in one of a photograph mode and a video cassette recorder (VCR) mode. In the photograph mode, the digital video camera records video data, obtained with an image picked up, onto one of a variety of information recording media including a magnetic disk, an optical disk, a magneto-optical disk and a semiconductor memory via a drive 432. In the VCR mode, the digital video camera records data supplied one of a video input and output unit 414, an audio input and output unit 416 and a communication unit 431 onto the recording medium or reproduces data recorded on the recording medium.

The photograph modes include a moving image photograph mode and a still image photograph mode. In the moving image photograph mode, the digital video camera photographs a moving image while also recording onto the recording medium a sound picked up together with the photographed image. In the still image photograph mode, the digital video camera photographs a still image. In the VCR mode, the digital video camera records data by operating an operation input unit 420 including a record button switch. By operating a reproducing button switch on the operation input unit 420, target data recorded on the recording medium is reproduced.

As shown in FIG. 21, the digital video camera includes an optical lens unit 411, a photoelectrical converter 412, a camera function controller 402, a video signal processor 413, a video input and output unit 414, a liquid-crystal display 415, an audio input and output unit 416, an audio processor 417, a communication unit 431, a controller (CPU) 401, an internal memory (RAM) 418, an internal memory (ROM) 419, the operation input unit 420, the drive 432 for the information recording medium and a power supply 441 for supplying power to each element.

The CPU 401 performs processes in accordance with programs stored on the ROM 419. The RAM 418 serves as a working area for temporarily storing interim results of each process. The first memory area M1 and the RMW memory (buffer) M2 discussed with reference to FIGS. 6A and 8A are also set up in the RAM 418.

The operation input unit 420 includes a variety of operation keys and function keys, including a mode switching key for switching from one mode to another mode among the moving image photograph mode, the still image photograph mode and the VCR mode, a shutter key for photographing a still image, a photograph start key for photographing a moving image, a recording key, a reproducing key, a stop key, a fast-forward key and a fast rewind key. Upon receiving an operation input from a user, the operation input unit 420 supplies the CPU 401 with an electrical signal responsive to the received operation input.

In response to the operation input from the user, the CPU 401 reads from the ROM 41 a program for an intended process and performs the process. By controlling each element, the CPU 401 performs a process responsive to an instruction from the user. The digital video camera is loaded with one of a variety of information recording media including a magnetic disk, an optical disk, a magnetooptical disk and a semiconductor memory. The digital video camera records a variety of information on the information recording medium via the drive 432 and reproduces information recorded on the information recording medium. A hard disk as the magnetic disk is set up as illustrated in FIG. 1, for example.

A hardware structure of the personal computer as one example of the information processing apparatus performing the above-referenced processes is described with reference to FIG. 22. A CPU 501 functions as a data processor for performing a process responsive an operating system (OS), a data recording process and a data reproducing process. These processes are executed in accordance with computer programs stored on a read-only memory (ROM) of the information processing apparatus and a data storage such as the hard disk.

A read-only memory (ROM) 502 stores a program and calculation parameters used by the CPU 501. A random-access memory (RAM) 503 stores a program used by the CPU 501 and parameters changing in the progress of the process performed by the CPU 501. The first memory area M1 and the RMW memory (buffer) M2, discussed with reference to FIGS. 6A and 8A, are arranged in the RAM 503. These elements are interconnected via a host bus 504 including a CPU bus. In the recording process of the management information, data updating is performed using the RAM 503 as a working area.

The host bus 504 connects to an external bus 506 such as a peripheral component interconnect/interface (PCI) bus via a bridge 505.

A keyboard 508 and a pointing device 509 are input devices used by the user. A display 510 includes one of a liquid-crystal display and a cathode ray tube (CRT) and displays a variety of information in the form of text or image.

A hard disk drive (HDD) 511 includes a hard disk and drives the hard disk. The hard disk is set up as described with reference to FIG. 1. The hard disk serves as a storage of video data files and further stores data processing programs and a variety of computer programs.

A drive 512 reads one of data and program recorded on a removable recording medium 521 such as a magnetic disk, an optical disk, a magnetooptical disk and a semiconductor and supplies the data or the program to the RAM 503 via an interface 507, the external bus 506, the bridge 505 and the host bust 504.

A connection port 514 is one of a USB (universal serial bus) port and an Institute of Electrical and Electronic Engineers (IEEE) standard 1394 port and connects to an external device 522. The connection port 514 connects to the CPU 501 via the interface 507, the external bus 506, the bridge 505 and the host bus 504.

The information processing apparatuses of FIGS. 21 and 22 are examples only. The information processing apparatus is not limited to the structures of FIGS. 21 and 22. Any structure is acceptable as long as the information processing apparatus performs the above-described processes.

The present invention is not limited to the hard disk drive (HDD). The present invention is applicable to any medium that allows a random access to be performed with the logical sector count N and the phase change point X set. The file system may be FAT 16, FAT 32 or any other file system. The above-described processes of the present invention are equally applicable to a removable storage medium in the same manner as to the internal storage medium.

The present invention has been described with reference to the particular embodiments. It is obvious to any person of ordinary skill in the art that modifications and changes are possible without departing from the scope of the present invention. The embodiments of the present invention have been discussed for exemplary purposes only and are not intended to limit the present invention. The scope of the invention is determined solely by reference to the claims appended hereto.

The series of process steps described above may be performed using hardware, software or a combination of both. If the process steps are performed using software, a program recording a process sequence of the software may be installed onto a memory in a computer in dedicated hardware or may be installed onto a general-purpose computer that performs a variety of processes. The program may be pre-recorded on the recording medium. The program may be installed from the recording medium. Alternatively, the program may be received via a network such as a local area network (LAN) and installed onto a recording medium such as a hard disk in the computer.

The process steps may be performed in a time-series order as described above. Alternatively, the process steps may be performed in parallel or separately as necessary or depending on a throughput of the apparatus performing each process. In this specification, the term system refers to a logical set of a plurality of apparatuses and elements of each apparatus are not necessarily housed in a single casing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for recording data onto a recording medium, comprising: an access controller configured to output, to a medium-specific controller, record data input from an application and directed to the recording medium, each physical sector corresponding to an integer number of logical sector units, a logical sector unit at a phase change point not being used to store any data, the access controller performing a first read-modify-write (RMW) operation only for read and write operations before the phase change point and a second RMW operation only for read and write operations including or after the phase change point, the access controller configured to perform the second RMW operation by verifying whether one of a record start position and a record end position of the record data input by a logical sector unit from the application is different from a delimitation position of a physical sector as an access unit of the recording medium managed by the medium-specific controller, acquiring the record data by the physical sector unit via the medium-specific controller and storing the record data onto a memory if one of the record start position and the record end position is different from the delimitation position, the storing the record data including changing a memory location of the data in the memory based on the phase change point, updating logical sector data as part of stored physical sector data with the record data input by the sector unit from the application, and outputting the updated physical sector data to the medium-specific controller.

2. The information processing apparatus according to claim 1, wherein the access controller verifies based on a count of logical sectors contained in one physical sector whether one of the record start position and the record end position of the record data input by the logical sector unit from the application is different from the delimitation position of the physical sector as the access unit of the recording medium managed by the medium-specific controller.

3. The information processing apparatus according to claim 1, wherein in the second RMW operation, the access controller copies the logical sector data as a target of the second RMW operation from a first memory area storing the record data input by the logical sector unit from the application to an RMW memory area.

4. The information processing apparatus according to claim 1, wherein the access controller generates, as a management information list of the record data, at least one write list listing a logical block address for the record data, a sector count indicating the number of sectors of the record data and offset information of a logical sector number and records the record data input from the application with reference to the at least one write list.

5. The information processing apparatus according to claim 4, wherein the access controller generates a first write list of the record data prior to a phase change point and a second write list of the record data subsequent to the phase change point if the phase change point where phase changes in the correspondence relationship between the logical sector and the physical sector is present and if the record data input by the logical sector unit from the application extends across the phase change point.

6. An information processing method for recording data onto a recording medium, comprising: controlling access by outputting, to a medium-specific controller, record data input from an application and directed to the recording medium, each physical sector corresponding to an integer number of logical sector units, a logical sector unit at a phase change point not being used to store any data, the controlling access including performing a first read-modify-write (RMW) operation only for read and write operations before the phase change point and a second RMW operation only for read and write operations including or after the phase change point, the controlling access including: verifying whether one of a record start position and a record end position of the record data input by a logical sector unit from the application is different from a delimitation position of a physical sector as an access unit of the recording medium managed by the medium-specific controller; and performing the second read-modify-write (RMW) operation by acquiring the record data by the physical sector unit via the medium-specific controller and storing the record data onto a memory if one of the record start position and the record end position is different from the delimitation position, the storing the record data including changing a memory location of the data in the memory based on the phase change point, updating logical sector data as part of the stored physical sector data with the record data input by the sector unit from the application, and outputting the updated physical sector data to the medium-specific controller.

7. The information processing method according to claim 6, wherein the controlling access comprises verifying based on a count of logical sectors contained in one physical sector whether one of the record start position and the record end position of the record data input by the logical sector unit from the application is different from the delimitation position of the physical sector as the access unit of the recording medium managed by the medium-specific controller.

8. The information processing method according to claim 6, wherein the controlling access comprises copying the logical sector data as a target of the second RMW operation from a first memory area storing the record data input by the logical sector unit from the application to an RMW memory area.

9. The information processing method according to claim 6, wherein the controlling access comprises generating, as a management information list of the record data, at least one write list listing a logical block address for the record data, a sector count indicating the number of sectors of the record data and offset information of a logical sector number and records the record data input from the application with reference to the at least one write list.

10. The information processing method according to claim 9, wherein the controlling access comprises generating a first write list of the record data prior to a phase change point and a second write list of the record data subsequent to the phase change point if the phase change point where phase changes in the correspondence relationship between the logical sector and the physical sector is present and if the record data input by the logical sector unit from the application extends across the phase change point.

11. A non-transitory computer readable medium encoded with a computer program that, when loaded on a processor, causes the processor to perform a method for recording data onto a recording medium, the method comprising:
controlling access by outputting, to a medium-specific controller, record data input from an application and directed to the recording medium, each physical sector corresponding to an integer number of logical sector units, a logical sector unit at a phase change point not being used to store any data, the controlling access including performing a first read-modify-write (RMW) operation only for read and write operations before the phase change point and a second RMW operation only for read and write operations including or after the phase change point, the controlling access including: verifying whether one of a record start position and a record end position of the record data input by a logical sector unit from the application is different from a delimitation position of a physical sector as an access unit of the recording medium managed by the medium-specific controller; and performing the second read-modify-write (RMW) operation by acquiring the record data by the physical sector unit via the medium-specific controller and storing the record data onto a memory if one of the record start position and the record end position is different from the delimitation position, the storing the record data including changing a memory location of the data in the memory based on the phase change point, updating logical sector data as part of stored physical sector data with the record data input by the sector unit from the application, and outputting the updated physical sector data to the medium-specific controller.

* * * * *